United States Patent
Koide et al.

(10) Patent No.: US 9,264,327 B2
(45) Date of Patent: Feb. 16, 2016

(54) COMMUNICATION NETWORK MANAGEMENT SYSTEM, METHOD AND PROGRAM, AND MANAGEMENT COMPUTER

(75) Inventors: Toshio Koide, Tokyo (JP); Nobuyuki Enomoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 515 days.

(21) Appl. No.: 13/067,848

(22) Filed: Jun. 29, 2011

(65) Prior Publication Data

US 2011/0264795 A1    Oct. 27, 2011

Related U.S. Application Data

(63) Continuation of application No. PCT/JP2010/050905, filed on Jan. 25, 2010.

(30) Foreign Application Priority Data

Feb. 2, 2009   (JP) ................. 2009-021330

(51) Int. Cl.
  *G06F 15/173* (2006.01)
  *H04L 12/26* (2006.01)
  *H04L 29/08* (2006.01)
  (Continued)

(52) U.S. Cl.
  CPC ............ *H04L 43/0805* (2013.01); *H04L 43/10* (2013.01); *H04L 12/26* (2013.01); *H04L 12/437* (2013.01); *H04L 67/14* (2013.01); *H04L 69/40* (2013.01)

(58) Field of Classification Search
  USPC ........................................ 709/223, 224, 225
  See application file for complete search history.

(56) References Cited

U.S. PATENT DOCUMENTS 6,501,754 B1 * 12/2002 Ohba ................. H04L 49/309
                                                     370/389
6,859,895 B2    2/2005 Kitamura
7,212,490 B1 *  5/2007 Kao .................... H04L 12/42
                                                     370/222
(Continued)

FOREIGN PATENT DOCUMENTS

JP     2002-77206 A     3/2002
JP    2003-533128 A    11/2003
(Continued)

OTHER PUBLICATIONS

S. Shah and M. Yip, "Extreme Networks' Ethernet Automatic Protection Switching (EAPS) Version 1", The Internet Society, Oct. 2003; (http://tools.ietf.org/html/rfc3619).

*Primary Examiner* — Richard G Keehn
*Assistant Examiner* — Mohammed Ahmed
(74) *Attorney, Agent, or Firm* — McGinn IP Law Group, PLLC

(57) ABSTRACT

A communication network management system has: a communication network including a plurality of nodes and a plurality of links connecting between the plurality of nodes; and a management computer connected to the plurality of nodes. A loop-shape communication route in the communication network is a loop route. The management computer transmits a frame to one node on the loop route. When receiving the frame, each node on the loop route forwards the received frame to a subsequent node along the loop route and, if a predetermined condition is satisfied, returns a response back to the management computer. The management computer determines whether or not a failure is occurring, based on reception state of the response.

18 Claims, 21 Drawing Sheets

100: COMMUNICATION NETWORK MANAGEMENT SYSTEM

(51) Int. Cl.
*H04L 29/14* (2006.01)
*H04L 12/437* (2006.01)

(56) References Cited

U.S. PATENT DOCUMENTS

| | | | | |
|---|---|---|---|---|
| 7,415,018 | B2* | 8/2008 | Jones | H04L 63/1458 370/392 |
| 7,966,651 | B2* | 6/2011 | Miao | H04L 45/00 709/223 |
| 2001/0048687 | A1* | 12/2001 | Coden | H04L 12/42 370/403 |
| 2002/0095627 | A1* | 7/2002 | Kitamura | G06F 11/0751 714/51 |
| 2004/0019673 | A1* | 1/2004 | Miyazaki | H04L 41/044 709/223 |
| 2004/0047353 | A1* | 3/2004 | Umayabashi | H04L 12/18 370/395.63 |
| 2004/0100971 | A1* | 5/2004 | Wray | G06F 11/0709 370/400 |
| 2004/0153529 | A1* | 8/2004 | Rikitake | H04J 3/14 709/220 |
| 2004/0160904 | A1* | 8/2004 | Enomoto | H04L 12/462 370/256 |
| 2004/0202186 | A1* | 10/2004 | Kimura | H04L 12/5601 370/395.65 |
| 2005/0058129 | A1* | 3/2005 | Jones | H04L 63/1458 370/389 |
| 2005/0078641 | A1* | 4/2005 | Kim | H04J 3/24 370/335 |
| 2005/0207348 | A1* | 9/2005 | Tsurumi | H04L 12/437 370/241 |
| 2005/0226265 | A1* | 10/2005 | Takatori | H04Q 11/0478 370/452 |
| 2005/0254429 | A1* | 11/2005 | Kato | H04L 41/0806 370/238 |
| 2005/0286430 | A1* | 12/2005 | Koga | H04L 12/462 370/241 |
| 2006/0045120 | A1* | 3/2006 | Mattina | H04L 12/43 370/460 |
| 2006/0224659 | A1* | 10/2006 | Yu | H04L 12/437 709/201 |
| 2006/0280122 | A1* | 12/2006 | Honma | H04L 12/42 370/235 |
| 2007/0127367 | A1* | 6/2007 | Ogasahara | H04W 40/22 370/226 |
| 2007/0177497 | A1* | 8/2007 | Quan | H04L 12/1877 370/223 |
| 2007/0204068 | A1* | 8/2007 | Oku | H04L 12/66 709/251 |
| 2007/0230482 | A1* | 10/2007 | Shim | H04L 12/42 370/400 |
| 2007/0253330 | A1* | 11/2007 | Tochio | H04L 12/423 370/222 |
| 2007/0263660 | A1* | 11/2007 | Mitsumori | H04L 12/467 370/469 |
| 2007/0264011 | A1* | 11/2007 | Sone | H04J 14/0204 398/10 |
| 2008/0144523 | A1* | 6/2008 | Nishi | H04L 43/16 370/253 |
| 2008/0219166 | A1* | 9/2008 | Ogasahara | H04L 12/42 370/235 |
| 2008/0247399 | A1* | 10/2008 | Hazard | H04L 45/02 370/395.31 |
| 2009/0073874 | A1* | 3/2009 | Maruyoshi | H04L 12/40182 370/225 |
| 2009/0252030 | A1* | 10/2009 | Kashyap | H04L 45/00 370/216 |
| 2010/0165883 | A1* | 7/2010 | Holness | H04L 45/28 370/255 |
| 2010/0250739 | A1* | 9/2010 | Murata | H04L 12/2602 709/224 |
| 2011/0047291 | A1* | 2/2011 | Ishii | H04L 45/00 709/238 |
| 2011/0128863 | A1* | 6/2011 | Hsieh | H04L 12/4625 370/249 |
| 2011/0264795 | A1* | 10/2011 | Koide | H04L 43/10 709/224 |

FOREIGN PATENT DOCUMENTS

| | | |
|---|---|---|
| JP | 3740982 B2 | 11/2005 |
| JP | 2006-115397 A | 4/2006 |
| JP | 2006-332787 A | 12/2006 |
| JP | 2007-274202 A | 10/2007 |
| WO | WO 2005/048540 A1 | 5/2005 |

* cited by examiner

100: COMMUNICATION NETWORK MANAGEMENT SYSTEM

Fig. 4

TPL:TOPOLOGY TABLE

| LINK ID | SOURCE SWITCH | SOURCE PORT | DESTINATION SWITCH | DESTINATION PORT | STATUS |
|---|---|---|---|---|---|
| A1 | 2 | 27 | 4 | 47 | 1 |
| A2 | 2 | 28 | 5 | 58 | 1 |
| A3 | 2 | 29 | 3 | 37 | 1 |
| A4 | 3 | 37 | 2 | 29 | 1 |
| A5 | 3 | 39 | 5 | 59 | 1 |
| A6 | 4 | 47 | 2 | 27 | 1 |
| A7 | 4 | 49 | 5 | 57 | 1 |
| A8 | 5 | 57 | 4 | 49 | 1 |
| A9 | 5 | 58 | 2 | 28 | 1 |
| A10 | 5 | 59 | 3 | 39 | 1 |

Fig. 6

LOP:LOOP TABLE

| LOOP ID | LINK ID |
|---|---|
| LP1 | A3 |
| LP1 | A5 |
| LP1 | A9 |
| LP2 | A2 |
| LP2 | A8 |
| LP2 | A6 |
| LP3 | A1 |
| LP3 | A7 |
| LP3 | A10 |
| LP3 | A4 |

Fig. 7

ENT : ENTRY DATA

| LOOP LP1 | | | | | |
|---|---|---|---|---|---|
| SWITCH | INPUT PORT | MAC DA | INPUT TTL | OUTPUT PORT | OUTPUT TTL |
| 3 | 37 | 00-00-4c-00-aa-01 | $\geq 2$ | 39 | TTL-1 |
| 3 | HOST | 00-00-4c-00-aa-01 | $\geq 2$ | 39 | TTL-1 |
| 3 | 37 | 00-00-4c-00-aa-01 | 1 | 39, HOST | 11 |
| 5 | 59 | 00-00-4c-00-aa-01 | $\geq 2$ | 58 | TTL-1 |
| 5 | HOST | 00-00-4c-00-aa-01 | $\geq 2$ | 58 | TTL-1 |
| 5 | 59 | 00-00-4c-00-aa-01 | 1 | 58, HOST | 11 |
| 2 | 28 | 00-00-4c-00-aa-01 | $\geq 2$ | 29 | TTL-1 |
| 2 | HOST | 00-00-4c-00-aa-01 | $\geq 2$ | 29 | TTL-1 |
| 2 | 28 | 00-00-4c-00-aa-01 | 1 | 29, HOST | 11 |
| LOOP LP2 | | | | | |
| SWITCH | INPUT PORT | MAC DA | INPUT TTL | OUTPUT PORT | OUTPUT TTL |
| 5 | 58 | 00-00-4c-00-aa-02 | $\geq 2$ | 57 | TTL-1 |
| 5 | HOST | 00-00-4c-00-aa-02 | $\geq 2$ | 57 | TTL-1 |
| 5 | 58 | 00-00-4c-00-aa-02 | 1 | 57, HOST | 11 |
| 4 | 49 | 00-00-4c-00-aa-02 | $\geq 2$ | 47 | TTL-1 |
| 4 | HOST | 00-00-4c-00-aa-02 | $\geq 2$ | 47 | TTL-1 |
| 4 | 49 | 00-00-4c-00-aa-02 | 1 | 47, HOST | 11 |
| 2 | 27 | 00-00-4c-00-aa-02 | $\geq 2$ | 28 | TTL-1 |
| 2 | HOST | 00-00-4c-00-aa-02 | $\geq 2$ | 28 | TTL-1 |
| 2 | 27 | 00-00-4c-00-aa-02 | 1 | 28, HOST | 11 |
| LOOP LP3 | | | | | |
| SWITCH | INPUT PORT | MAC DA | INPUT TTL | OUTPUT PORT | OUTPUT TTL |
| 4 | 47 | 00-00-4c-00-aa-03 | $\geq 2$ | 49 | TTL-1 |
| 4 | HOST | 00-00-4c-00-aa-03 | $\geq 2$ | 49 | TTL-1 |
| 4 | 47 | 00-00-4c-00-aa-03 | 1 | 49, HOST | 11 |
| 5 | 57 | 00-00-4c-00-aa-03 | $\geq 2$ | 59 | TTL-1 |
| 5 | HOST | 00-00-4c-00-aa-03 | $\geq 2$ | 59 | TTL-1 |
| 5 | 57 | 00-00-4c-00-aa-03 | 1 | 59, HOST | 11 |
| 3 | 39 | 00-00-4c-00-aa-03 | $\geq 2$ | 37 | TTL-1 |
| 3 | HOST | 00-00-4c-00-aa-03 | $\geq 2$ | 37 | TTL-1 |
| 3 | 39 | 00-00-4c-00-aa-03 | 1 | 37, HOST | 11 |
| 2 | 29 | 00-00-4c-00-aa-03 | $\geq 2$ | 27 | TTL-1 |
| 2 | HOST | 00-00-4c-00-aa-03 | $\geq 2$ | 27 | TTL-1 |
| 2 | 29 | 00-00-4c-00-aa-03 | 1 | 27, HOST | 11 |

Fig. 8

22: FORWARDING TABLE

| INPUT PORT | MAC DA | MAC SA | INPUT TTL | OUTPUT PORT | OUTPUT TTL |
|---|---|---|---|---|---|
| 28 | 00-00-4c-00-aa-01 | 00-00-4c-00-12-34 | ≧2 | 29 | TTL-1 |
| HOST | 00-00-4c-00-aa-01 | 00-00-4c-00-12-34 | ≧2 | 29 | TTL-1 |
| 28 | 00-00-4c-00-aa-01 | 00-00-4c-00-12-34 | 1 | 29,HOST | 11 |
| 27 | 00-00-4c-00-aa-02 | 00-00-4c-00-12-34 | ≧2 | 28 | TTL-1 |
| HOST | 00-00-4c-00-aa-02 | 00-00-4c-00-12-34 | ≧2 | 28 | TTL-1 |
| 27 | 00-00-4c-00-aa-02 | 00-00-4c-00-12-34 | 1 | 28,HOST | 11 |
| 29 | 00-00-4c-00-aa-03 | 00-00-4c-00-12-34 | ≧2 | 27 | TTL-1 |
| HOST | 00-00-4c-00-aa-03 | 00-00-4c-00-12-34 | ≧2 | 27 | TTL-1 |
| 29 | 00-00-4c-00-aa-03 | 00-00-4c-00-12-34 | 1 | 27,HOST | 11 |

Fig. 9

32:FORWARDING TABLE

| INPUT PORT | MAC DA | MAC SA | INPUT TTL | OUTPUT PORT | OUTPUT TTL |
|---|---|---|---|---|---|
| 37 | 00-00-4c-00-aa-01 | 00-00-4c-00-12-34 | ≧2 | 39 | TTL-1 |
| HOST | 00-00-4c-00-aa-01 | 00-00-4c-00-12-34 | ≧2 | 39 | TTL-1 |
| 37 | 00-00-4c-00-aa-01 | 00-00-4c-00-12-34 | 1 | 39,HOST | 11 |
| 39 | 00-00-4c-00-aa-03 | 00-00-4c-00-12-34 | ≧2 | 37 | TTL-1 |
| HOST | 00-00-4c-00-aa-03 | 00-00-4c-00-12-34 | ≧2 | 37 | TTL-1 |
| 39 | 00-00-4c-00-aa-03 | 00-00-4c-00-12-34 | 1 | 37,HOST | 11 |

Fig. 10

42:FORWARDING TABLE

| INPUT PORT | MAC DA | MAC SA | INPUT TTL | OUTPUT PORT | OUTPUT TTL |
|---|---|---|---|---|---|
| 49 | 00-00-4c-00-aa-02 | 00-00-4c-00-12-34 | ≧2 | 47 | TTL-1 |
| HOST | 00-00-4c-00-aa-02 | 00-00-4c-00-12-34 | ≧2 | 47 | TTL-1 |
| 49 | 00-00-4c-00-aa-02 | 00-00-4c-00-12-34 | 1 | 47,HOST | 11 |
| 47 | 00-00-4c-00-aa-03 | 00-00-4c-00-12-34 | ≧2 | 49 | TTL-1 |
| HOST | 00-00-4c-00-aa-03 | 00-00-4c-00-12-34 | ≧2 | 49 | TTL-1 |
| 47 | 00-00-4c-00-aa-03 | 00-00-4c-00-12-34 | 1 | 49,HOST | 11 |

Fig. 11

52: FORWARDING TABLE

| INPUT PORT | MAC DA | MAC SA | INPUT TTL | OUTPUT PORT | OUTPUT TTL |
|---|---|---|---|---|---|
| 59 | 00-00-4c-00-aa-01 | 00-00-4c-00-12-34 | ≧2 | 58 | TTL-1 |
| HOST | 00-00-4c-00-aa-01 | 00-00-4c-00-12-34 | ≧2 | 58 | TTL-1 |
| 59 | 00-00-4c-00-aa-01 | 00-00-4c-00-12-34 | 1 | 58,HOST | 11 |
| 58 | 00-00-4c-00-aa-02 | 00-00-4c-00-12-34 | ≧2 | 57 | TTL-1 |
| HOST | 00-00-4c-00-aa-02 | 00-00-4c-00-12-34 | ≧2 | 57 | TTL-1 |
| 58 | 00-00-4c-00-aa-02 | 00-00-4c-00-12-34 | 1 | 57,HOST | 11 |
| 57 | 00-00-4c-00-aa-03 | 00-00-4c-00-12-34 | ≧2 | 59 | TTL-1 |
| HOST | 00-00-4c-00-aa-03 | 00-00-4c-00-12-34 | ≧2 | 59 | TTL-1 |
| 57 | 00-00-4c-00-aa-03 | 00-00-4c-00-12-34 | 1 | 59,HOST | 11 |

Fig. 12

FR: CHECK FRAME

| MAC DA | MAC SA | TTL |
|---|---|---|
| 00-00-4c-00-aa-01 | 00-00-4c-00-12-34 | |

Fig. 15

TPL: TOPOLOGY TABLE

| LINK ID | SOURCE SWITCH | SOURCE PORT | DESTINATION SWITCH | DESTINATION PORT | STATUS |
|---|---|---|---|---|---|
| A1 | 2 | 27 | 4 | 47 | 1 |
| A2 | 2 | 28 | 5 | 58 | 1 |
| A3 | 2 | 29 | 3 | 37 | 0 |
| A4 | 3 | 37 | 2 | 29 | 1 |
| A5 | 3 | 39 | 5 | 59 | 0 |
| A6 | 4 | 47 | 2 | 27 | 1 |
| A7 | 4 | 49 | 5 | 57 | 1 |
| A8 | 5 | 57 | 4 | 49 | 1 |
| A9 | 5 | 58 | 2 | 28 | 0 |
| A10 | 5 | 59 | 3 | 39 | 1 |

Fig. 17

22: FORWARDING TABLE

| INPUT PORT | MAC DA | MAC SA | INPUT TTL | OUTPUT PORT | OUTPUT TTL |
|---|---|---|---|---|---|
| 28 | 00-00-4c-00-aa-01 | 00-00-4c-00-12-34 | ≧2 | 29 | TTL-1 |
| HOST | 00-00-4c-00-aa-01 | 00-00-4c-00-12-34 | ≧2 | 29 | TTL-1 |
| 28 | 00-00-4c-00-aa-01 | 00-00-4c-00-12-34 | 1 | HOST | 11 |
| 27 | 00-00-4c-00-aa-02 | 00-00-4c-00-12-34 | ≧2 | 28 | TTL-1 |
| HOST | 00-00-4c-00-aa-02 | 00-00-4c-00-12-34 | ≧2 | 28 | TTL-1 |
| 27 | 00-00-4c-00-aa-02 | 00-00-4c-00-12-34 | 1 | 28,HOST | 11 |
| 29 | 00-00-4c-00-aa-03 | 00-00-4c-00-12-34 | ≧2 | 27 | TTL-1 |
| HOST | 00-00-4c-00-aa-03 | 00-00-4c-00-12-34 | ≧2 | 27 | TTL-1 |
| 29 | 00-00-4c-00-aa-03 | 00-00-4c-00-12-34 | 1 | 27,HOST | 11 |

Fig. 18

32: FORWARDING TABLE

| INPUT PORT | MAC DA | MAC SA | INPUT TTL | OUTPUT PORT | OUTPUT TTL |
|---|---|---|---|---|---|
| 37 | 00-00-4c-00-aa-01 | 00-00-4c-00-12-34 | ≧2 | 39 | TTL-1 |
| HOST | 00-00-4c-00-aa-01 | 00-00-4c-00-12-34 | ≧2 | 39 | TTL-1 |
| 37 | 00-00-4c-00-aa-01 | 00-00-4c-00-12-34 | 1 | HOST | 11 |
| 39 | 00-00-4c-00-aa-03 | 00-00-4c-00-12-34 | ≧2 | 37 | TTL-1 |
| HOST | 00-00-4c-00-aa-03 | 00-00-4c-00-12-34 | ≧2 | 37 | TTL-1 |
| 39 | 00-00-4c-00-aa-03 | 00-00-4c-00-12-34 | 1 | 37,HOST | 11 |

Fig. 19

52: FORWARDING TABLE

| INPUT PORT | MAC DA | MAC SA | INPUT TTL | OUTPUT PORT | OUTPUT TTL |
|---|---|---|---|---|---|
| 59 | 00-00-4c-00-aa-01 | 00-00-4c-00-12-34 | ≧2 | 58 | TTL-1 |
| HOST | 00-00-4c-00-aa-01 | 00-00-4c-00-12-34 | ≧2 | 58 | TTL-1 |
| 59 | 00-00-4c-00-aa-01 | 00-00-4c-00-12-34 | 1 | HOST | 11 |
| 58 | 00-00-4c-00-aa-02 | 00-00-4c-00-12-34 | ≧2 | 57 | TTL-1 |
| HOST | 00-00-4c-00-aa-02 | 00-00-4c-00-12-34 | ≧2 | 57 | TTL-1 |
| 58 | 00-00-4c-00-aa-02 | 00-00-4c-00-12-34 | 1 | 57,HOST | 11 |
| 57 | 00-00-4c-00-aa-03 | 00-00-4c-00-12-34 | ≧2 | 59 | TTL-1 |
| HOST | 00-00-4c-00-aa-03 | 00-00-4c-00-12-34 | ≧2 | 59 | TTL-1 |
| 57 | 00-00-4c-00-aa-03 | 00-00-4c-00-12-34 | 1 | 59,HOST | 11 |

Fig. 21

TPL: TOPOLOGY TABLE

| LINK ID | SOURCE SWITCH | SOURCE PORT | DESTINATION SWITCH | DESTINATION PORT | STATUS |
|---|---|---|---|---|---|
| A1 | 2 | 27 | 4 | 47 | 1 |
| A2 | 2 | 28 | 5 | 58 | 1 |
| A3 | 2 | 29 | 3 | 37 | 0 |
| A4 | 3 | 37 | 2 | 29 | 1 |
| A5 | 3 | 39 | 5 | 59 | 1 |
| A6 | 4 | 47 | 2 | 27 | 1 |
| A7 | 4 | 49 | 5 | 57 | 1 |
| A8 | 5 | 57 | 4 | 49 | 1 |
| A9 | 5 | 58 | 2 | 28 | 1 |
| A10 | 5 | 59 | 3 | 39 | 1 |

COMMUNICATION NETWORK MANAGEMENT SYSTEM, METHOD AND PROGRAM, AND MANAGEMENT COMPUTER

CROSS-REFERENCE TO RELATED APPLICATION

This is a continuation of International Application No. PCT/JP2010/050905, filed on Jan. 25, 2010.

TECHNICAL FIELD

The present invention relates to a communication network management technique that performs centralized management of a communication network by using a management computer.

BACKGROUND ART

In recent years, a communication network has a significant role as a social infrastructure that provides various services, and failure of the communication network has an incalculable impact on users. Therefore, health-checking of the communication network has become a very important issue.

Patent Literature 1 (International Publication WO2005/048540) discloses a technique that uses a keep-alive frame to detect a failure in a communication network. More specifically, in a communication system in which a plurality of base nodes perform communication through one or more relay node, each base node transmits a keep-alive frame that is broadcasted by the relay node. Here, the plurality of base nodes mutually transmit and receive the keep-alive frame and detect failure by monitoring arrival state of the keep-alive frame transmitted from the other side node. In this case, in order to health-check all physical links in the communication network, it is necessary to configure a plurality of communication routes so as to cover all the physical links and to transmit and receive the keep-alive frame with respect to each communication route. That is, it is required to transmit and receive a large number of keep-alive frames. This causes increase in transmission and reception burden placed on each base node.

Non-Patent Literature 1 (S. Shah and M. Yip, "Extreme Networks' Ethernet Automatic Protection Switching (EAPS) Version 1", The Internet Society, October 2003; (http://tools.ietf.org/html/rfc3619).) discloses a health-check technique in a communication network that is configured in a ring shape. In this case, a plurality of switches are connected through communication lines to form a ring shape, and one health-check frame is transferred sequentially along the ring. For example, a master switch on the ring transmits the health-check frame from a first port. Another switch forwards the received health-check frame to the next switch. The master switch receives the self-transmitted health-check frame at a second port, and thereby can confirm that no failure occurs. This technique assumes such a ring-shaped network structure and thus is not versatile.

Patent Literature 2 (Japanese Patent No. 3740982) discloses a technique that a management host computer performs health-check of a plurality of host computers. First, the management host computer determines an order of the health-check for the plurality of host computers. Next, the management host computer generates a health-check packet into which a health-check table is incorporated. The health-check table has a plurality of entries respectively related to the plurality of host computers, and the plurality of entries are arranged in the above determined order. Each entry includes an address of the related host computer and a check flag. Then, the management host computer transmits the health-check packet to a first host computer. A host computer that receives the health-check packet searches for the related entry in the health-check table and marks the check flag of the corresponding entry. After that, the host computer refers to the address in the next entry and transmits the health-check packet to the next host computer. Due to repetition of the above-mentioned processing, one health-check packet travels the host computers. Eventually, the management host computer receives the health-check packet that has traveled in this manner. Then, the management host computer determines that a failure occurs in a host computer the corresponding check flag of which is not marked.

According to Patent Literature 3 (Japanese Patent Publication JP-2006-332787), one health-check packet travels a plurality of monitor-target terminals, as in the case of Patent Literature 2. A similar health-check table is incorporated into the health-check packet. However, each entry includes, instead of the above-mentioned check flag, a check list in which such information as a date and time and an operating status is to be written. A monitoring terminal transmits the health-check packet to a first monitor-target terminal. When receiving the health-check packet, the monitor-target terminal judges whether or not itself is operating normally. In a case of a normal operation, the monitor-target terminal searches for the related entry in the health-check table and writes designated information such as the date and time and the operating status in the check list of the corresponding entry. Then, the monitor-target terminal refers to the address in the next entry and transmits the health-check packet to the next monitor-target terminal. Here, if communication with the next monitor-target terminal is impossible, the monitor-target terminal transmits the health-check packet to the monitor-target terminal after the next monitor-target terminal. Due to repetition of the above-mentioned processing, one health-check packet travels the monitor-target terminals. Eventually, the monitoring terminal receives the health-check packet that has traveled in this manner. If the designated information is not written in any check list, the monitoring terminal determines that a failure occurs.

CITATION LIST

Patent Literature

[Patent Literature 1] International Publication WO2005/048540
[Patent Literature 2] Japanese Patent No. 3740982
[Patent Literature 3] Japanese Patent Publication JP-2006-332787

Non-Patent Literature

[Non-Patent Literature 1] S. Shah and M. Yip, "Extreme Networks' Ethernet Automatic Protection Switching (EAPS) Version 1", The Internet Society, October 2003; (http://tools.ietf.org/html/rfc3619).

SUMMARY OF INVENTION

According to the technique described in the above-mentioned Patent Literature 2 or Patent Literature 3, the management computer (management host computer, monitoring terminal) performs centralized management of a communication network. More specifically, the management computer transmits a health-check packet, and the health-check packet returns back to the management computer after travelling a plurality of nodes (host computers, monitor-target terminals). The management computer performs health-checking of each node, based on information written in the returned health-check packet. However, according to the technique, in order to perform the health-checking continuously, the management computer needs to periodically repeat the transmission of the health-check packet. This causes increase in burden placed on the management computer.

An object of the present invention is to reduce burden placed on a management computer that performs centralized management of a communication network.

In an aspect of the present invention, a communication network management system is provided. The communication network management system has: a communication network including a plurality of nodes and a plurality of links connecting between the plurality of nodes; and a management computer connected to the plurality of nodes. A loop-shape communication route in the communication network is a loop route. The management computer transmits a frame to one node on the loop route. When receiving the frame, each node on the loop route forwards the received frame to a subsequent node along the loop route and, if a predetermined condition is satisfied, returns a response back to the management computer. The management computer determines whether or not a failure is occurring, based on reception state of the response.

In another aspect of the present invention, a management computer that manages a communication network is provided. The communication network includes a plurality of nodes and a plurality of links connecting between the plurality of nodes. The management computer has: a storage unit in which loop route information indicating a loop route being a loop-shape communication route in the communication network is stored; an entry control unit configured to instruct each node on the loop route; and a monitoring unit configured to transmit a frame to one node on the loop route. The entry control unit instructs the each node to, when receiving the frame, forward the received frame to a subsequent node along the loop route and, if a predetermined condition is satisfied, return a response back to the management computer. The monitoring unit determines whether or not a failure is occurring, based on reception state of the response.

In still another aspect of the present invention, a communication network management method that manages a communication network by using a management computer is provided. The communication network includes a plurality of nodes and a plurality of links connecting between the plurality of nodes. A loop-shape communication route in the communication network is a loop route. The communication network management method includes: (A) transmitting a frame from the management computer to one node on the loop route; (B) forwarding, by each node on the loop route, the frame to a subsequent node along the loop route and, if a predetermined condition is satisfied, returning a response back to the management computer; and (C) determining whether or not a failure is occurring, based on reception state of the response in the management computer.

In still another aspect of the present invention, a management program recorded on a tangible computer-readable medium that, when executed, causes a management computer to perform management processing of a communication network is provided. The communication network includes a plurality of nodes and a plurality of links connecting between the plurality of nodes. The management processing includes: (a) storing loop route information indicating a loop route being a loop-shape communication route in the communication network, in a storage device; (b) instructing each node on the loop route to, when receiving a frame, forward the received frame to a subsequent node along the loop route and, if a predetermined condition is satisfied, return a response back to the management computer; (c) transmitting a frame to one node on the loop route; and (d) determining whether or not a failure is occurring, based on reception state of the response.

According to the present invention, it is possible to reduce burden placed on a management computer that performs centralized management of a communication network.

BRIEF DESCRIPTION OF DRAWINGS

The above and other objects, advantages and features of the present invention will be more apparent from the following description of certain exemplary embodiments taken in conjunction with the accompanying drawings.

FIG. 4 shows an example of a topology table.

FIG. 6 shows an example of a loop table.

FIG. 7 shows an example of an entry data.

FIG. 8 shows a forwarding table of a switch 2.

FIG. 9 shows a forwarding table of a switch 3.

FIG. 10 shows a forwarding table-of a switch 4.

FIG. 11 shows a forwarding table of a switch 5.

FIG. 12 is a conceptual diagram showing an example of a check frame.

FIG. 15 shows the topology table after update.

FIG. 17 shows the forwarding table of the switch 2 in failure location identification processing.

FIG. 18 shows the forwarding table of the switch 3 in the failure location identification processing.

FIG. 19 shows the forwarding table of the switch 5 in the failure location identification processing.

FIG. 21 shows the topology table after update.

DESCRIPTION OF EMBODIMENTS

1. Summary

Figure 1:
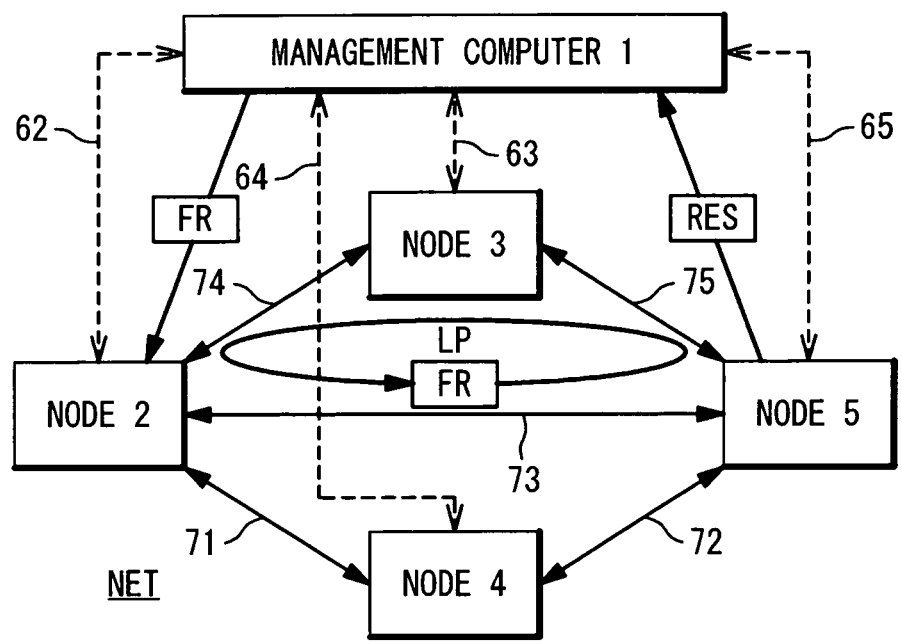
FIG. 1 schematically shows a communication network management system according to an exemplary embodiment of the present invention.

FIG. 1 schematically shows a communication network management system 100 according to an exemplary embodiment of the present invention. In the communication network management system 100 according to the present exemplary embodiment, centralized management of a communication network is performed by a management computer. That is, the communication network management system 100 is provided with a communication network NET and a management computer 1 that manages the communication network NET, as shown in FIG. 1.

The communication network NET includes a plurality of nodes 2 to 5 and a plurality of physical links 71 to 75 connecting between the nodes 2 to 5. The physical link 71 is a signal line that bi-directionally connects the node 2 and the node 4. The node 2 and the node 4 can communicate bi-directionally through the physical link 71. The physical link 72 is a signal line that bi-directionally connects the node 4 and the node 5. The node 4 and the node 5 can communicate bi-directionally through the physical link 72. The physical link 73 is a signal line that bi-directionally connects the node 5 and the node 2. The node 5 and the node 2 can communicate bi-directionally through the physical link 73. The physical link 74 is a signal line that bi-directionally connects the node 2 and the node 3. The node 2 and the node 3 can communicate bi-directionally through the physical link 74. The physical link 75 is a signal line that bi-directionally connects the node 3 and the node 5. The node 3 and the node 5 can communicate bi-directionally through the physical link 75.

A control link 62 is a signal line that bi-directionally connects the management computer 1 and the node 2. A control link 63 is a signal line that bi-directionally connects the management computer 1 and the node 3. A control link 64 is a signal line that bi-directionally connects the management computer 1 and the node 4. A control link 65 is a signal line that bi-directionally connects the management computer 1 and the node 5. The management computer 1 and the nodes 2 to 5 can communicate bi-directionally through the control links 62 to 65, respectively.

A loop-shape communication route in the communication network NET is hereinafter referred to as a "loop route LP". For example, as shown in FIG. 1, "node 2-physical link 73-node 5-physical link 75-node 3-physical link 74-node 2 . . . " forms one loop route LP.

The management computer 1 transmits one frame for health-checking (hereinafter referred to as a "check frame FR") to one node on the loop route LP. For example, the management computer 1 transmits one check frame FR to the node 2 on the loop route LP. The node 2, when receiving the check frame FR, forwards the check frame FR to the subsequent node 5 along the loop route LP. The node 5, when receiving the check frame FR, forwards the check frame FR to the subsequent node 3 along the loop route LP. The node 3, when receiving the check frame FR, forwards the check frame FR to the subsequent node 2 along the loop route LP. Thereafter, each node on the loop route LP repeats the forwarding of the check frame FR along the loop route LP in a similar way. As a result, the check frame FR repeatedly circulates in the loop route LP, if no failure is occurring on the loop route LP.

Moreover, when receiving the check frame FR and if a predetermined condition is satisfied, each node returns a "response RES" indicating the reception of the check frame FR back to the management computer 1. For example, the predetermined condition is that TTL (Time To Live) of the check frame FR reaches a predetermined threshold value. Alternatively, the predetermined condition may be that a hop number of the check frame FR reaches a predetermined threshold value. Alternatively, the predetermined condition may be satisfied in each node with a predetermined probability or with a predetermined period. A node among the nodes on the loop route LP where the above-mentioned predetermined condition is satisfied is hereinafter referred to as a "response node". It is the response node that returns the response RES indicating the reception of the check frame FR back to the management computer 1. The response RES may be a reception notification signal indicating the reception or may be a copy of the received check frame FR. The response node transmits the response RES to the management computer 1 and continues the transfer of the check frame FR along the loop route LP. For example, as shown in FIG. 1, the node 5 on the loop route LP becomes the response node at a certain timing, transmits the response RES to the management computer 1 and transmits the check frame FR to the node 3. Thereafter, the circulation of the check frame FR along the loop route LP continues in a similar way. It should be noted that the response node may be fixed or a plurality of nodes on the loop route LP may in turn become the response node.

The management computer 1 can determine whether or not a failure relating to the loop route LP is occurring, based on reception state of the response RES from the loop route LP. For example, if the management computer 1 receives the response RES from any node on the loop route LP within a predetermined period of time, it means that the check frame FR is steadily circulating in the loop route LP. Therefore, the management computer 1 can determine that no failure is occurring in the loop route LP. On the other hand, if the management computer 1 fails to receive the response RES from all nodes on the loop route LP within the predetermined period of time, it means that the circulation of the check frame FR in the loop route LP has ceased. Therefore, the management computer 1 can determine that some sort of failure is occurring in the loop route LP.

According to the present exemplary embodiment, as described above, once a check frame FR is transmitted from the management computer 1 to the loop route LP for one time, then the check frame FR repeatedly circulates in the loop route LP. When the predetermined condition is satisfied, each node on the loop route LP returns the response RES to the management computer 1. The management computer 1 can determine whether or not a failure relating to the loop route LP is occurring, based on reception state of the response RES from the loop route LP. According to the present exemplary embodiment, the management computer 1 needs not to periodically repeat the transmission of the check frame FR in order to perform the health-checking continuously. It is therefore possible to reduce burden placed on the management computer 1.

The present invention can be applied to health-check of nodes and physical links on a LAN of companies, data centers, universities and the like and health-check of communication equipments and physical links of telecommunication carriers.

2. Concrete Example

Hereinafter, an exemplary embodiment of the present invention will be described in more detail. Various methods are possible as a method for achieving the traveling of the check frame FR along a predetermined route in the communication network NET. In the following description, for example, each node is provided with a "forwarding table" in order to achieve the traveling of the check frame FR. The forwarding table is a table that indicates a correspondence relationship between input sources and forwarding destinations of the check frames FR. Each node can forward the check frame FR received from an input source to a designated forwarding destination, by referring to the forwarding table.

Contents of the forwarding table of each node are set up by each node in accordance with an instruction from the management computer 1. More specifically, the management computer 1 uses the control link (62, 63, 64, 65) to instruct each node (2, 3, 4, 5) to set up the forwarding table. Here, the management computer 1 instructs each node to set up the forwarding table such that the check frames FR are forwarded along the loop route LP. Each node sets up the contents of the forwarding table in accordance with the instruction from the management computer 1.

Various interfaces are possible as an interface between the management computer and the nodes for achieving the processing described above. For example, Openflow (refer to http://www.openflowswitch.org/) is applicable. In this case, an "Openflow Controller" serves as the management computer 1 and an "Openflow Switch" serves as each of the nodes 2 to 5. It is possible to set up the forwarding table by using "Secure Channel" of the Openflow. Alternatively, GMPLS (Generalized Multi-Protocol Label Switching) also is applicable. In this case, the management computer instructs a GMPLS switch to set up the forwarding table. Alternatively, VLAN (Virtual LAN) also is applicable. In this case, the management computer can control VLAN setting of each switch by using an MIB (Management Information Base) interface.

In the following description, let us consider a case where the Openflow is used as the interface between the management computer and the nodes.

2-1. Configuration Example

Figure 2:
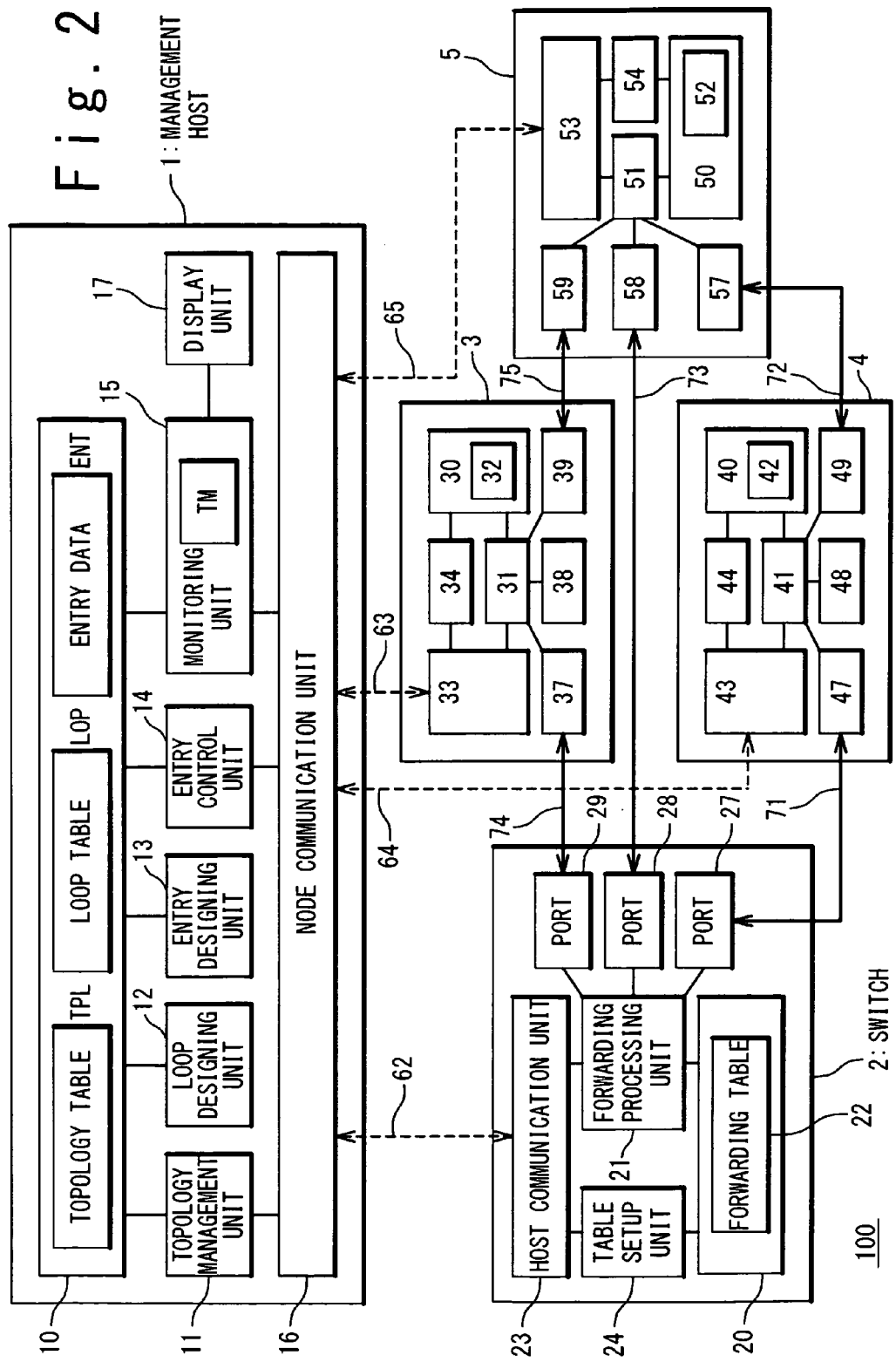
FIG. 2 is a block diagram showing a configuration of the communication network management system according to an exemplary embodiment of the present invention.

FIG. 2 is a block diagram showing a configuration of the communication network management system 100 according to the present exemplary embodiment. A management host 1 (Openflow Controller) in FIG. 2 is equivalent to the management computer 1 in FIG. 1. Switches 2 to 5 (Openflow Switch) in FIG. 2 are equivalent to the nodes 2 to 5 in FIG. 1, respectively.

The management host 1 has a storage unit 10, a topology management unit 11, a loop designing unit 12, an entry designing unit 13, an entry control unit 14, a monitoring unit 15, a node communication unit 16 and a display unit 17. The node communication unit 16 is connected to the switches 2 to 5 through the control links 62 to 65, respectively. The management host 1 can communicate bi-directionally with the switches 2 to 5 by using the node communication unit 16 and the control links 62 to 65.

The storage unit 10 is a storage device such as a RAM and an HDD. A topology table TPL, a loop table LOP, an entry data ENT and the like are stored in the storage unit 10. The topology table TPL (topology information) indicates the above-mentioned physical topology of the communication network NET, namely, a connection relationship between the switches 2 to 5. The loop table LOP (loop route information) indicates the loop route LP in the communication network NET. The entry data ENT indicates contents of an entry to be set in a forwarding table of each node. The details will be described later.

The topology management unit 11, the loop designing unit 12, the entry designing unit 13, the entry control unit 14 and the monitoring unit 15 are functional blocks that are realized by a processor executing a computer program (management program). A function and an operation of each functional block will be described later.

The switch 2 has a table storage unit 20, a forwarding processing unit 21, a host communication unit 23, a table setup unit 24, a port 27, a port 28 and a port 29. The host communication unit 23 is equivalent to the "Secure Channel" of the "Openflow Switch". The host communication unit 23 is connected to the management host 1 through the control link 62, and the switch 2 can communicate bi-directionally with the management host 1 by using the host communication unit 23 and the control link 62. Moreover, each port (communication interface) is connected to another switch through the physical link, and the switch 2 can communicate bi-directionally with another switch by using the port and the physical link.

The table storage unit 20 is a storage device such as a RAM and an HDD. The above-mentioned forwarding table 22 that indicates a correspondence relationship between input sources and forwarding destinations of the check frames FR is stored in the table storage unit 20.

The forwarding processing unit 21 receives the check frame FR from the host communication unit 23 (i.e. management host 1). Alternatively, the forwarding processing unit 21 receives the check frame FR from any port (i.e. another switch). Then, by referring to the forwarding table 22 stored in the table storage unit 20, the forwarding processing unit 21 forwards the check frame FR received from an input source to a forwarding destination (host communication unit 23 or port) designated by the forwarding table 22. In a case where a plurality of forwarding destinations are designated, the forwarding processing unit 21 copies the check frame FR and forwards them respectively to the plurality of forwarding destinations.

The table setup unit 24 receives through the host communication unit 23 the above-mentioned instruction (table setup command) from the management host 1. Then, in accordance with the instruction (table setup command) from the management host 1, the table setup unit 24 sets (add, delete, change) the contents of the forwarding table 22 stored in the table storage unit 20.

The forwarding processing unit 21, the host communication unit 23 and the table setup unit 24 can be realized by a processor executing a computer program.

Other switches 3 to 5 each has a similar configuration to that of the switch 2. That is, the switch 3 has a table storage unit 30, a forwarding processing unit 31, a host communication unit 33, a table setup unit 34, a port 37, a port 38 and a port 39. A forwarding table 32 is stored in the table storage unit 30. The switch 4 has a table storage unit 40, a forwarding processing unit 41, a host communication unit 43, a table setup unit 44, a port 47, a port 48 and a port 49. A forwarding table 42 is stored in the table storage unit 40. The switch 5 has a table storage unit 50, a forwarding processing unit 51, a host communication unit 53, a table setup unit 54, a port 57, a port 58 and a port 59. A forwarding table 52 is stored in the table storage unit 50.

In the example shown in FIG. 2, the physical topology of the communication network NET, namely, the connection relationship between the switches 2 to 5 is as follows. The port 27 of the switch 2 and the port 47 of the switch 4 are connected bi-directionally through the physical link 71. The port 49 of the switch 4 and the port 57 of the switch 5 are connected bi-directionally through the physical link 72. The port 58 of the switch 5 and the port 28 of the switch 2 are connected bi-directionally through the physical link 73. The port 29 of the switch 2 and the port 37 of the switch 3 are connected bi-directionally through the physical link 74. The port 39 of the switch 3 and the port 59 of the switch 5 are connected bi-directionally through the physical link 75.

2-2. Processing Example

Figure 3:
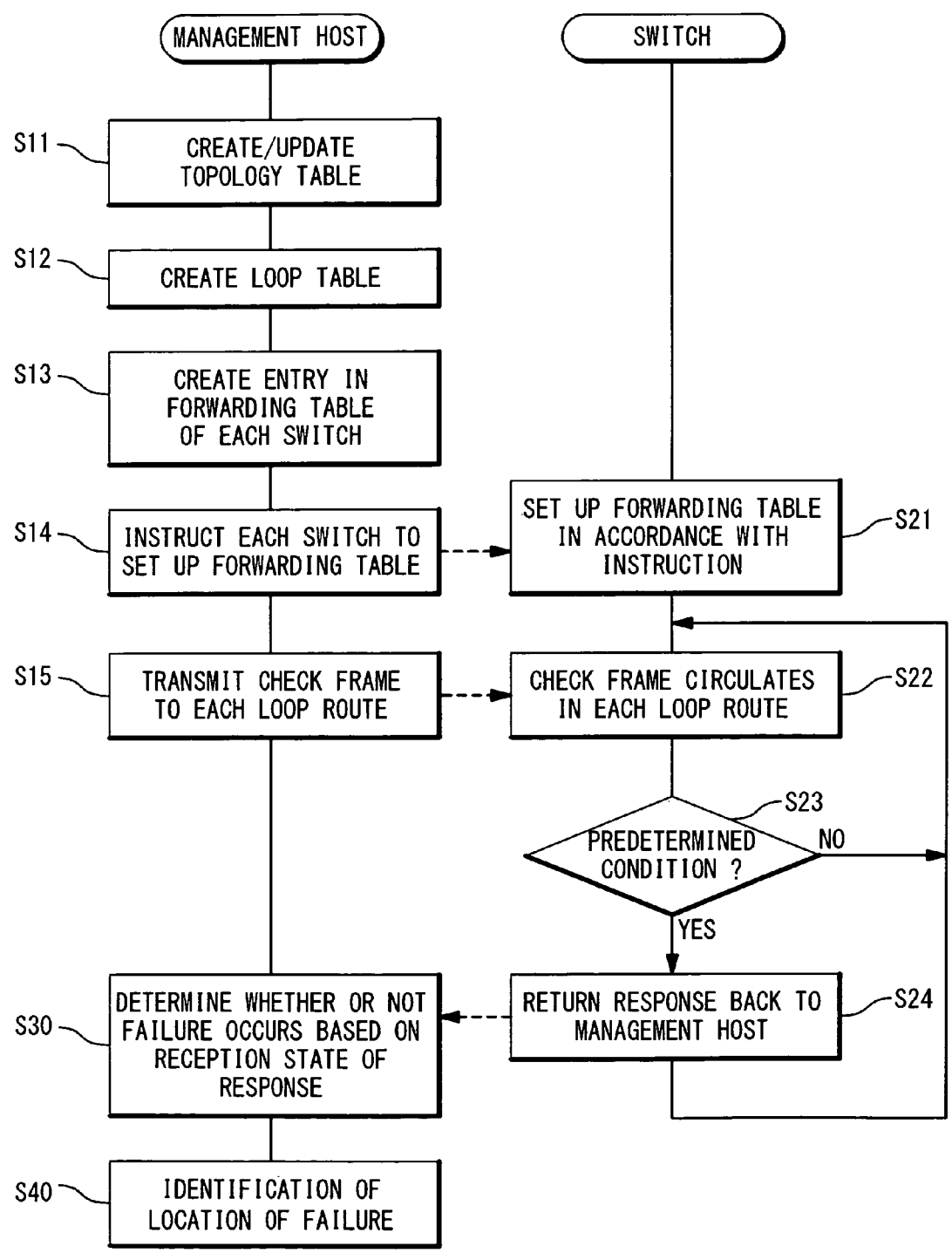
FIG. 3 is a flow chart showing a communication network management method according to the exemplary embodiment of the present invention.

FIG. 3 is a flow chart showing a communication network management method according to the present exemplary embodiment. The communication network management processing according to the present exemplary embodiment will be described in detail with reference to FIGS. 2 and 3 as appropriate. It should be noted that management processing by the management host 1 is realized by the management host 1 executing a management program.

Step S11:

The topology management unit 11 creates the topology table TPL (topology information) indicating the physical topology of the communication network NET and stores it in the storage unit 10. Moreover, the topology management unit 11 receives a topology change notification received from each switch through the node communication unit 16. Here, the topology change notification is information indicating change in the physical topology of the communication network NET and includes connection information of a new switch, up/down notification of a physical link and the like. The topology management unit 11 updates the topology table TPL in accordance with the topology change notification.

Here, let us consider a case where the physical topology of the communication network NET is as shown in FIG. 2. FIG. 4 shows an example of the topology table TPL in that case. The topology table TPL has a plurality of entries that are respectively associated with the plurality of physical links 71 to 75. In the case where the physical link is bi-directional, the entry is created with respect to each direction. Each entry indicates a link ID, a source switch, a source port, a destination switch, a destination port and a status flag with regard to the associated physical link.

The link ID is an identifier given to the associated physical link. The source switch is a switch as a start-point of the physical link, and the source port is a port of the source switch. The destination switch is a switch as an end-point of the physical link, and the destination port is a port of the destination switch. For example, in FIG. 4, the first entry (link ID=A1) is associated with the physical link 71 from the switch 2 toward the switch 4, and the sixth entry (link ID=A6) is associated with the physical link 71 from the switch 4 to the switch 2. The same applies to the other entries.

The status flag included in each entry indicates whether the associated physical link is available or not. If validity of a physical link is confirmed, the status flag of the entry associated with the physical link is set to "1 (available)". On the other hand, if validity of a physical link is not yet confirmed or failure occurs at the physical link, the status flag of the entry associated with the physical link is set to "0 (not available)". In the example shown in FIG. 4, the status flags of all the entries are "1".

Step S12:

The loop designing unit 12 refers to the topology table TPL stored in the storage unit 10 to determine (design) the loop route LP in the communication network NET. Then, the loop designing unit 12 creates the loop table LOP (loop route information) indicating the determined loop route LP and stores it in the storage unit 10.

Here, the loop designing unit 12 may determine one or more loop routes LP such that all the physical links 71 to 75 in the communication network NET (all the link IDs: A1 to A10) is covered by the one or more loop routes LP. In other words, the loop designing unit 12 designs a group of loop routes such that each link ID path belongs to any loop route. In a case where a plurality of loop routes are obtained, successive loop IDs such as "LP1", "LP2", "LP3" . . . are given to the respective loop routes.

Figure 5:
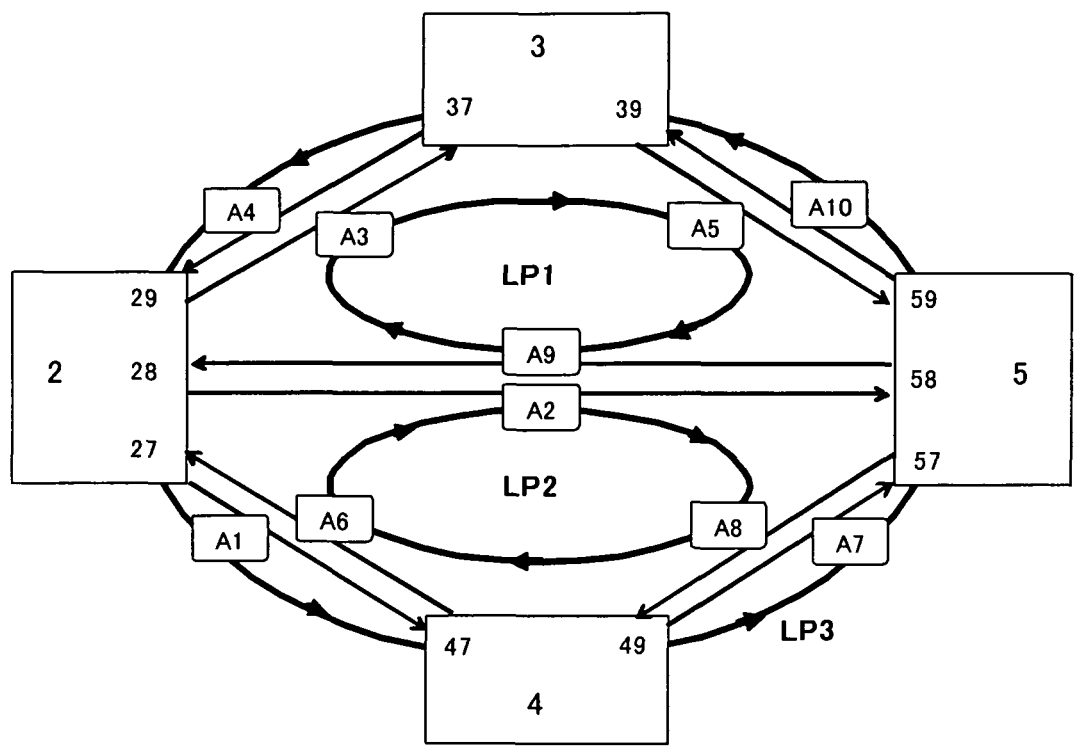
FIG. 5 shows various examples of loop routes.

FIG. 5 shows three loop routes LP1 to LP3 in the communication network NET in the present example. The loop route LP1 is a loop route comprising the following three link IDs: A3 (from the switch 2 to the switch 3), A5 (from the switch 3 to the switch 5) and A9 (from the switch 5 to the switch 2). The loop route LP2 is a loop route comprising the following three link IDs: A2 (from the switch 2 to the switch 5), A8 (from the switch 5 to the switch 4) and A6 (from the switch 4 to the switch 2). The loop route LP3 is a loop route comprising the following four link IDs: A1 (from the switch 2 to the switch 4), A7 (from the switch 4 to the switch 5), A10 (from the switch 5 to the switch 3) and A4 (from the switch 3 to the switch 2). As can be clearly seen from FIG. 5, all the link IDs A1 to A10 is covered by the three kinds of loop routes LP1 to LP3. It should be noted that still another loop route may be designed in addition to the loop routes LP1 to LP3. That is, a group of loop routes may be designed such that a single link ID belongs to a plurality of loop routes.

FIG. 6 shows an example of the loop table LOP indicating the loop routes LP1 to LP3 shown in FIG. 5. As shown in FIG. 6, the loop table LOP indicates in order the plurality of links ID of each loop route. More specifically, each entry of the loop table LOP includes the loop ID and the link ID, and an order of entries having the same loop ID represents an order of links of the corresponding loop route.

Step S13:

The present exemplary embodiment has the following characteristics.

(1) In the check frame FR, TTL (Time to Live) is set as forwarding count information.

(2) The management host 1 transmits the check frame FR in which the TTL is set to a predetermined initial value, to the loop route LP.

(3) Each switch on the loop route LP, when receiving the check frame FR, decreases the TTL by 1 and then forwards the check frame FR to the subsequent switch along the loop route LP.

(4) If the TTL becomes 0 (threshold value) in a certain switch, the switch becomes the "response switch" that returns the response RES back to the management computer 1. The response switch forwards the received check frame FR as the response RES to the management computer 1. Moreover, the response switch forwards the check frame FR to the subsequent switch along the loop route after resetting the TTL to the predetermined initial value.

The entry designing unit 13 designs the entry in the forwarding table of each switch such that the above-described operations (3) and (4) can be achieved in each switch. Here, the entry designing unit 13 refers to the topology table TPL and the loop table LOP stored in the storage unit 10. A data indicating the entry designed by the entry designing unit 13 is an entry data ENT and is stored in the storage unit 10.

FIG. 7 shows an example of the entry data ENT created in the present exemplary embodiment. The entry data ENT has a plurality of entries, and each entry indicates "switch", "input port", "destination MAC address (MAC DA)", "input TTL", "output port" and "output TTL".

The input port represents the input source (port or host communication unit) to which the check frame FR is input. If the input source is any port (i.e. another switch), the input port is expressed by its port number. If the input source is the host communication unit (i.e. the management host 1), the input port is expressed by "HOST".

The destination MAC address is used as identification information for identifying the loop route in which the check frame FR circulates. For that purpose, a special MAC address is used as the destination MAC address. Different destination MAC addresses are allocated to different loop routes. In the present example, "00-00-4c-00-aa-01", "00-00-4c-00-aa-02" and "00-00-4c-00-aa-03" are allocated to the loop routes LP1 to LP3, respectively.

The input TTL indicates a TTL condition of the check frame FR input from the input port.

The output port represents the forwarding destination (port or host communication unit) of the check frame FR. If the forwarding destination is any port (i.e. another switch), the output port is expressed by its port number. If the forwarding destination is the host communication unit (i.e. management host 1), the output port is expressed by "HOST". It should be noted that a plurality of output ports may be set with respect to one entry. In this case, the check frame FR is output to the respective output ports.

The output TTL defines a TTL operation method or a TTL setting method in the switch receiving the check frame FR.

The entry in the entry data ENT is created with respect to each loop route and each switch. Also, as shown in FIG. 7, three kinds of entries are created with respect to each switch on each loop route. For example, the following three kinds of entries are created for the switch 3 on the loop route LP1.

The first entry is "switch=3, input port=37, MAC DA=00-00-4c-00-aa-01, input TTL=2 or more, output port=39, output TTL=input TTL−1". As shown in FIG. 5, the switch 3 on the loop route LP receives the check frame FR from the preceding switch 2 and forwards the check frame FR to the subsequent switch 5. That is, the switch 3 on the loop route LP1 receives the check frame FR from the port 37 connected to the preceding switch 2 and transmits the check frame FR from the port 39 connected to the subsequent switch 5. It can be seen that such the operation is achieved by the first entry. Furthermore, the first entry defines that "if the switch 3 receives the check frame FR whose TTL is 2 or more, it decreases the TTL by 1".

The second entry defines the processing in a case of receiving the check frame FR from the management host 1, and is different in the "input port" as compared with the first entry. More specifically, in the second entry, the input port is set to HOST. As a result, the switch 3 on the loop route LP1, when receiving the check frame FR from the management host 1, forwards the check frame FR to the subsequent switch 5 along the loop route LP1. In this manner, the above-described operation (3) in the switch 3 on the loop route LP1 can be achieved by the first entry and the second entry.

The third entry is for achieving the above-described operation (4) and defines the processing of the response switch. More specifically, in the third entry, the input TTL is set to 1, the output port is set to 39 and HOST, and further the output TTL is set to the initial value (=11). When the switch 3 receives the check frame FR whose TTL=1, the TTL becomes 0 in the switch 3. In this case, the switch 3 resets the TTL to the initial value (=11) in order to continue the circulation of the check frame FR in the loop route LP1. Moreover, the switch 3 not only forwards the check frame FR to the subsequent switch 5 along the loop route LP1 but also forwards it to the management host 1. The check frame FR transmitted from the switch 3 to the management host 1 is equivalent to the response RES. In this manner, the operation (4) as the response switch can be achieved by the third entry.

It should be noted that the initial value of the TTL is set to 11 in the present example, but it is not limited to that. Also, the initial value of the TTL may be set separately for the respective loop routes LP1 to LP3. A preferable method of setting the initial value of the TTL will be described later.

Step S14:

The entry control unit 14 instructs each switch (2, 3, 4, 5) to set up the forwarding table (22, 32, 42, 52). More specifically, the entry control unit 14 refers to the entry data ENT stored in the storage unit 10 and puts together the entries included in the entry data ENT with respect to each switch. Then, the entry control unit 14 instructs each switch to set the associated entry in the forwarding table. In other words, the entry control unit 14 instructs each switch on the loop route to forward the received check frame FR to the subsequent switch along the loop route and, if the predetermined condition is satisfied, return the response RES back to the management host 1. The entry control unit 14 transmits a table setup command indicating the instruction to each switch (2, 3, 4, 5) through the node communication unit 16 and the control link (62, 63, 64, 65).

Step S21:

In the switch 2, the table setup unit 24 receives the table setup command from the host communication unit 23. Then, the table setup unit 24 sets, in accordance with the table setup command, the contents of the forwarding table 22 stored in the table storage unit 20. The setting of the forwarding table 22 is based on the entries associated with the switch 2 included in the entry data ENT shown in FIG. 7.

FIG. 8 shows an example of the setting of the forwarding table 22 of the switch 2 in the present exemplary embodiment. The forwarding table 22 indicates "input port", "destination MAC address (MAC DA)", "source MAC address (MAC SA)", "input TTL", "output port" and "output TTL". The input port, the destination MAC address, the input TTL, the output port and the output TTL are as described above. The source MAC address is a MAC address "00-00-4c-00-12-34" of the management host 1. In a case where only one management host 1 is used, the source MAC address may be omitted. It should be noted that "input port", "MAC DA", "MAC SA" and "input TTL" in the forwarding table are fields used as a search keyword when searching the table.

In the switch 3, the table setup unit 34 receives the table setup command from the host communication unit 33. Then, the table setup unit 34 sets, in accordance with the table setup command, the contents of the forwarding table 32 stored in the table storage unit 30. FIG. 9 shows an example of the setting of the forwarding table 32 of the switch 3. The setting of the forwarding table 32 is based on the entries associated with the switch 3 included in the entry data ENT shown in FIG. 7.

In the switch 4, the table setup unit 44 receives the table setup command from the host communication unit 43. Then, the table setup unit 44 sets, in accordance with the table setup command, the contents of the forwarding table 42 stored in the table storage unit 40. FIG. 10 shows an example of the setting of the forwarding table 42 of the switch 4. The setting of the forwarding table 42 is based on the entries associated with the switch 4 included in the entry data ENT shown in FIG. 7.

In the switch 5, the table setup unit 54 receives the table setup command from the host communication unit 53. Then, the table setup unit 54 sets, in accordance with the table setup command, the contents of the forwarding table 52 stored in the table storage unit 50. FIG. 11 shows an example of the setting of the forwarding table 52 of the switch 5. The setting of the forwarding table 52 is based on the entries associated with the switch 5 included in the entry data ENT shown in FIG. 7.

Step S15:

After the setting of the forwarding table in each switch is completed, the monitoring unit 15 of the management host 1 transmits the check frame FR to each of the loop routes LP1 to LP3. As an example, let us describe hereinafter the transmission of the check frame FR from the management host 1 to the loop route LP1 and the circulation of the check frame FR in the loop route LP1. The same applied to the other loop routes LP2 and LP3.

FIG. 12 shows an example of the check frame FR used for the loop route LP1. As shown in FIG. 12, the check frame FR includes the destination MAC address (MAC DA), the source MAC address (MAC SA) and the TTL. The destination MAC address is set to "00-00-4c-00-aa-01" allocated to the loop route LP1. The source MAC address is set to the MAC address "00-00-4c-00-12-34" of the management host 1.

The monitoring unit 15 of the management host 1 transmits the check frame FR shown in FIG. 12 to an arbitrary switch on the loop route LP1 only once. For example, the monitoring unit 15 transmits the check frame FR to the switch 2. The transmission of the check frame FR from the monitoring unit 15 to the switch 2 is performed through the node communication unit 16 and the control link 62. When the check frame FR is transmitted from the monitoring unit 15 to the switch 2, the TTL in the check frame FR is set to the predetermined initial value (=11). Also, the monitoring unit 15 starts a timer TM at the same time as the transmission of the check frame FR. A set time of the timer TM is designed to be sufficiently long. It should be noted that the timer TM is provided separately for the respective loop routes LP1 to LP3.

Figure 13:
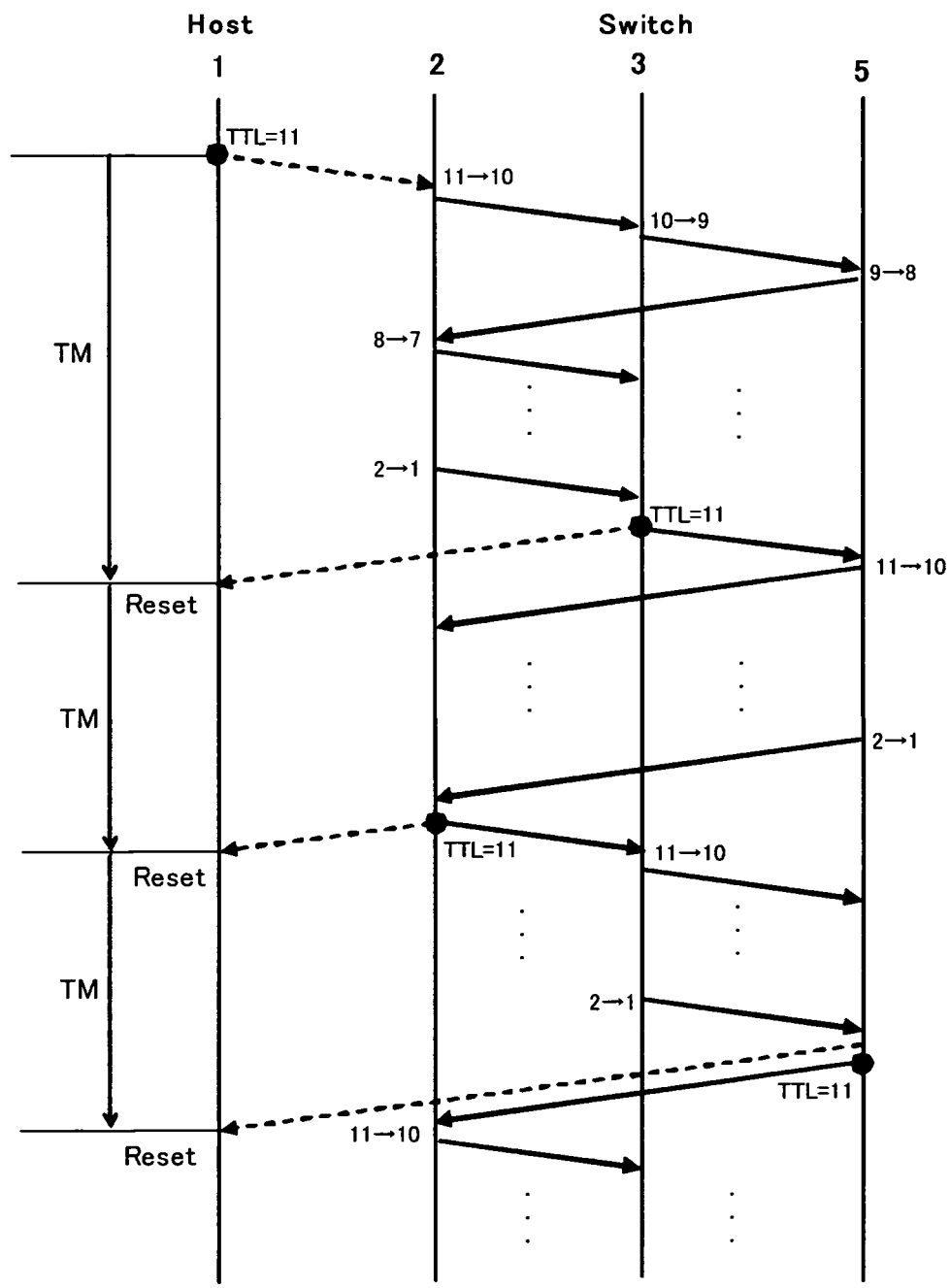
FIG. 13 shows an example of frame forwarding processing in the present exemplary embodiment.

Step S22:

FIG. 13 shows frame forwarding processing with regard to the loop route LP1. In FIG. 13, dashed arrows indicate communications by using the control links 62 to 65, and solid arrows indicate communications by using the physical links 71 to 75. As described above, one check frame FR (TTL=11) is transmitted from the management host 1 to the switch 2 and the timer TM is started concurrently.

The forwarding processing unit 21 of the switch 2 receives the check frame FR (TTL=11) from the host communication unit 23. The forwarding processing unit 21 searches the forwarding table 22 by using the input port (HOST), MAC DA (00-00-4c-00-aa-01), MAC SA (00-00-4c-00-12-34) and input TTL (11) of the received check frame FR as the search keyword. Referring to FIG. 8, it can be seen that the second entry "input port=HOST, MAC DA=00-00-4c-00-aa-01, MAC SA=00-00-4c-00-12-34, input TTL=2 or more, output port=29, output TTL=input TTL−1" in the forwarding table 22 is the hit entry in this case. Therefore, the forwarding processing unit 21 decreases the TTL by 1 and then outputs the check frame FR (TTL=10) to the port 29. The port 29 is connected to the port 37 of the switch 3, and thus the check frame FR is forwarded from the switch 2 to the subsequent switch 3 on the loop route LP1.

The forwarding processing unit 31 of the switch 3 receives the check frame FR (TTL=10) from the port 37. The forwarding processing unit 31 searches the forwarding table 32 by using the input port (37), MAC DA (00-00-4c-00-aa-01), MAC SA (00-00-4c-00-12-34) and input TTL (10) of the received check frame FR as the search keyword. Referring to FIG. 9, it can be seen that the first entry "input port=37, MAC DA=00-00-4c-00-aa-01, MAC SA=00-00-4c-00-12-34, input TTL=2 or more, output port=39, output TTL=input TTL−1" in the forwarding table 32 is the hit entry in this case. Therefore, the forwarding processing unit 31 decreases the TTL by 1 and then outputs the check frame FR (TTL=9) to the port 39. The port 39 is connected to the port 59 of the switch 5, and thus the check frame FR is forwarded from the switch 3 to the subsequent switch 5 on the loop route LP1.

The forwarding processing unit 51 of the switch 5 receives the check frame FR (TTL=9) from the port 59. The forwarding processing unit 51 searches the forwarding table 52 by using the input port (59), MAC DA (00-00-4c-00-aa-01), MAC SA (00-00-4c-00-12-34) and input TTL (9) of the received check frame FR as the search keyword. Referring to FIG. 11, it can be seen that the first entry "input port=59, MAC DA=00-00-4c-00-aa-01, MAC SA=00-00-4c-00-12-34, input TTL=2 or more, output port=58, output TTL=input TTL−1" in the forwarding table 52 is the hit entry in this case. Therefore, the forwarding processing unit 51 decreases the TTL by 1 and then outputs the check frame FR (TTL=8) to the port 58. The port 58 is connected to the port 28 of the switch 2, and thus the check frame FR is forwarded from the switch 5 to the subsequent switch 2 on the loop route LP1.

The forwarding processing unit 21 of the switch 2 receives the check frame FR (TTL=8) from the port 28. The forwarding processing unit 21 searches the forwarding table 22 by using the input port (28), MAC DA (00-00-4c-00-aa-01), MAC SA (00-00-4c-00-12-34) and input TTL (8) of the received check frame FR as the search keyword. Referring to FIG. 8, it can be seen that the first entry "input port=28, MAC DA=00-00-4c-00-aa-01, MAC SA=00-00-4c-00-12-34, input TTL=2 or more, output port=29, output TTL=input TTL−1" in the forwarding table 22 is the hit entry in this case. Therefore, the forwarding processing unit 21 decreases the TTL by 1 and then outputs the check frame FR (TTL=7) to the port 29. The port 29 is connected to the port 37 of the switch 3, and thus the check frame FR is forwarded from the switch 2 to the subsequent switch 3 on the loop route LP1.

Thereafter, each switch on the loop route LP1 repeats the forwarding of the check frame FR along the loop route LP1 in a similar way. As a result, the check frame FR repeatedly circulates in the loop route LP1.

Steps S23 And S24:

The check frame FR circulates in the loop route LP1, and the TTL becomes 1 at a certain timing. The switch 3 that receives the check frame FR whose TTL=1 becomes the response switch that returns the response RES back to the management host 1 (Step S23).

More specifically, the forwarding processing unit 31 of the switch 3 receives the check frame FR (TTL=1) from the port 37. The forwarding processing unit 31 searches the forwarding table 32 by using the input port (37), MAC DA (00-00-4c-00-aa-01), MAC SA (00-00-4c-00-12-34) and input TTL (1) of the received check frame FR as the search keyword. Referring to FIG. 9, it can be seen that the third entry "input port=37, MAC DA32 00-00-4c-00-aa-01, MAC SA=00-00-4c-00-12-34, input TTL=1, output port=39, HOST, output TTL=11" in the forwarding table 32 is the hit entry in this case. Therefore, the forwarding processing unit 31 resets the TTL to the initial value (=11) and then outputs the check frame FR (TTL=11) to the port 39 and the host communication unit 33 (HOST).

The port 39 is connected to the port 59 of the switch 5, and thus the check frame FR (TTL=11) is forwarded from the switch 3 to the subsequent switch 5 on the loop route LP1. Thereafter, the circulation of the check frame FR in the loop route LP1 continues in a similar way. Meanwhile, the host communication unit 33 transmits the check frame FR to the management host 1 through the control link 63. The check frame FR serves as the response RES that is transmitted from the switch 3 as the response switch to the management host 1.

Step S30:

The monitoring unit 15 of the management host 1 receives the check frame FR from the switch 3 through the node communication unit 16. When receiving the check frame FR, the monitoring unit 15 resets the timer TM for the loop route LP1.

Meanwhile, the circulation of the check frame FR in the loop route LP1 is continuing as shown in FIG. 13 (Step S22). Then, the switch 2 becomes the response switch, next to the switch 3 (Step S23). The switch 2 as the response switch transmits the check frame FR to the management host 1 (Step S24). The monitoring unit 15 of the management host 1 receives the check frame FR from the switch 2 and resets the timer TM. Next, the switch 5 becomes the response switch (Step S23). The switch 5 as the response switch transmits the check frame FR to the management host 1 (Step S24). The monitoring unit 15 of the management host 1 receives the check frame FR from the switch 5 and resets the timer TM. Thereafter, the processing is repeated in a similar way.

The monitoring unit 15 of the management host 1 can determine whether or not a failure relating to the loop route LP1 is occurring, based on reception state of the check frame FR (response RES) from each switch on the loop route LP1.

(Normal Determination)

In the case of the example shown in FIG. 13, the monitoring unit 15 intermittently receives the check frame FR from the switches on the loop route LP1. Here, the timer TM is set sufficiently longer than the circulation cycle of the check frame FR in the loop route LP1. Therefore, the monitoring unit 15 receives the check frame FR from any switch on the loop route LP1 before the timer TM expires. That is to say, the monitoring unit 15 receives the response RES from any switch on the loop route LP1 within a predetermined period of time. This means that the check frame FR is steadily circulating in the loop route LP1. Therefore, the monitoring unit 15 can determine that no failure is occurring in the loop route LP1.

(Failure Occurrence Determination)

Figure 14:
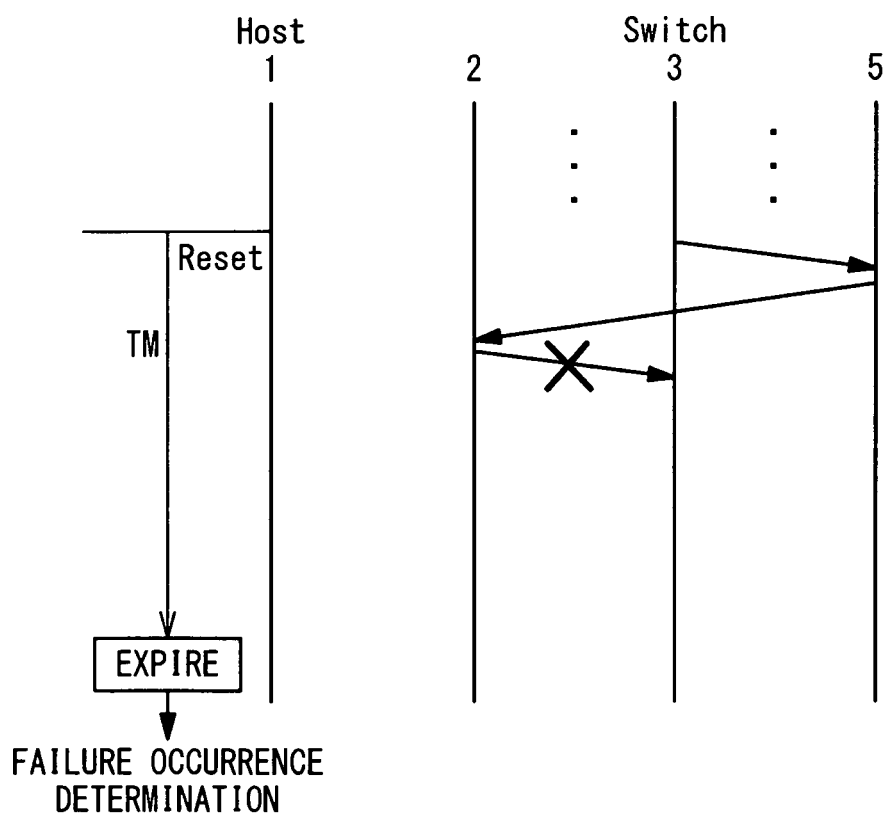
FIG. 14 shows another example of frame forwarding processing in the present exemplary embodiment.

FIG. 14 shows a case where a failure occurs at the physical link 74 (link ID=A3) from the switch 2 to the switch 3, for example. In this case, the check frame FR on the loop route LP1 is lost between the switch 2 and the switch 3. That is, the circulation of the check frame FR in the loop route LP1 ceases. As a result, the monitoring unit 15 does not receive the check frame FR from any node on the loop route LP1, and thus the timer TM is not reset. In other words, the monitoring unit 15 fails to receive the response RES from all nodes on the loop route LP1 within the predetermined period of time, and thus the timer TM expires. If the timer TM expires, the monitoring unit 15 determines that some sort of failure is occurring in the loop route LP1.

In the case of the failure occurrence determination, the monitoring unit 15 updates the topology table TPL stored in the storage unit 10. More specifically, the monitoring unit 15 rewrites the status flags associated with all the link IDs (A3, A5, A9) constituting the loop route LP1 that is determined to have the failure occurrence, from "1" to "0". As a result, the topology table TPL is updated from one shown in FIG. 4 to one shown in FIG. 15. Moreover, the monitoring unit 15 has the display unit 17 display the contents of the topology table TPL shown in FIG. 15. The display unit 17 represents that a failure is occurring in the loop route LP1.

(Detection of Failure of Control Link)

In the example shown in FIG. 13, all the switches 3, 2 and 5 on the loop route LP1 become the response switch in order. In this case, the monitoring unit 15 can also determine whether or not a failure is occurring at the control link between the management host 1 and the switch.

Figure 16:
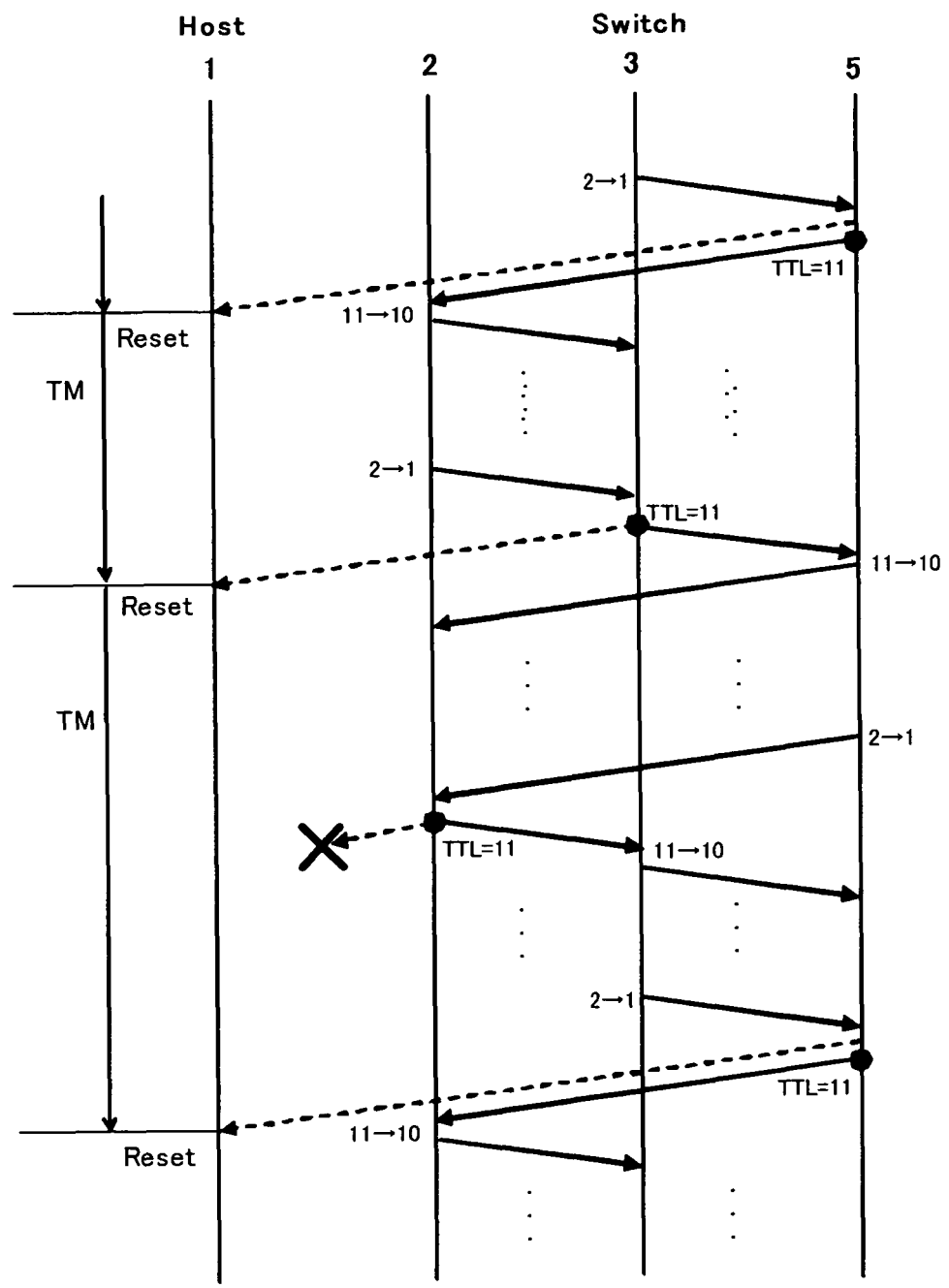
FIG. 16 shows still another example of frame forwarding processing in the present exemplary embodiment.

FIG. 16 shows a case where a failure occurs at the control link 62 from the switch 2 to the management host 1, for example. In this case, the monitoring unit 15 of the management host 1 intermittently receives the check frame FR from the switches 5 and 3 but does not receive the check frame FR from the switch 2. That is, the monitoring unit 15 fails to receive the response RES only from a specific switch 2, although the timer TM is intermittently reset and does not expire. This means that the check frame FR is steadily circulating in the loop route LP1 while some sort of failure is occurring at the control link 62 from the switch 2 to the management host 1. Therefore, the monitoring unit 15 determines that a failure is occurring between the switch 2 and the management host 1.

The reason why all switches 3, 2 and 5 on the loop route LP1 become the response switch is that the initial value of the TTL of the check frame FR is set to "11". In other words, the reason is that the number of links (the number of switches) included in the loop route LP1 is 3 and the initial value (=11) of the TTL is set to a natural number other than multiples of 3. In this case, the switches on the loop route LP1 become the response switch for every 11 switches along the loop route LP1.

This can be generalized as follows. The number of links (the number of switches) included in a certain loop route LP is "n". In this case, it is preferable that the initial value of the TTL of the check frame FR for the loop route LP is selected from a group consisting of natural numbers other than multiples of n and multiples of a factor of n. As a simple method, the initial value may be set to a number that is obtained by adding or subtracting 1 to or from multiples of n. The initial value is denoted by "i". In this case, the switches on the loop route LP become the response switch for every i switches along the loop route LP. That is, all of the n switches on the loop route LP can become the response switch.

In the example shown in FIG. 5, the number of links included in the loop route LP1 is 3, the number of links included in the loop route LP2 is 3, and the number of links included in the loop route LP3 is 4. As shown in FIG. 7, the initial value of the TTL is set to 11 with regard to any of the loop routes LP1 to LP3 in the present exemplary embodiment. As a result, the respective switches on the loop route can become the response switch in order. In the example shown in FIG. 13, the switches become the response switch in an order of switches 3, 2 and 5. However, the setting is not limited to that. Different initial values may be applied to the respective loop routes LP1 to LP3.

The initial value of the TTL contributes to a frequency at which the management host 1 receives the response RES. To put it the other way around, a frequency at which the management host 1 receives the response RES is adjustable based on the setting of the initial value of the TTL. The initial value of the TTL is preferably set to an appropriate value depending on system specification.

Step S40:

In the example shown in FIGS. 14 and 15, a location of failure (link ID=A3) is not yet identified, although the failure occurrence in the loop route LP1 is detected. In Step S40, the management host 1 identifies the location of failure in the loop route LP1.

First, the entry control unit 14 instructs all switches (2, 3, 5) belonging to the loop route LP1 where the failure occurrence is detected to temporarily change the forwarding table (22, 32, 52). More specifically, the entry control unit 14 instructs rewriting of the forwarding table such that the response switch forwards the check frame FR only to the management host 1. Therefore, the entry control unit 14 instructs each of the switches 2, 3 and 5 to change the output port in the entry associated with "MAC DA32 00-00-4c-00-aa-01, input TTL=1" in the forwarding table to just "HOST".

As a result, the forwarding table 22 of the switch 2 is temporarily changed from one shown in FIG. 8 to one shown in FIG. 17. Also, the forwarding table 32 of the switch 3 is temporarily changed from one shown in FIG. 9 to one shown in FIG. 18. Also, the forwarding table 52 of the switch 5 is temporarily changed from one shown in FIG. 11 to one shown in FIG. 19.

After the changing of the forwarding table in each switch is completed, the monitoring unit 15 transmits the check frame FR concurrently to all the switches (2, 3, 5) belonging to the loop route LP1. At this time, the TTL of each check frame FR is set to "2". Also, the monitoring unit 15 starts the timer TM at the same time as the transmission of the check frame FR.

Figure 20:
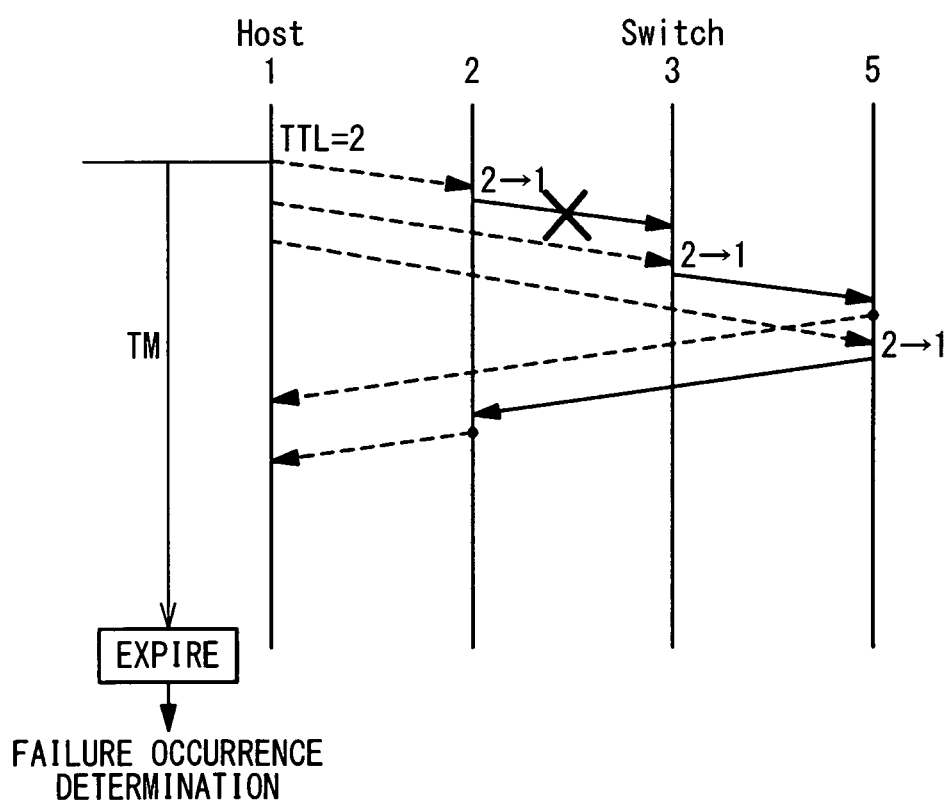
FIG. 20 shows the failure location identification processing in the present exemplary embodiment.

FIG. 20 shows frame forwarding processing in Step S40.

The forwarding processing unit 21 of the switch 2 receives the check frame FR (TTL=2) from the host communication unit 23 (HOST). The forwarding processing unit 21 refers to the forwarding table 22 shown in FIG. 17 to decrease the TTL by 1 and then output the check frame FR (TTL=1) to the port 29. The check frame FR is output toward the switch 3. However, since a failure is occurring at the physical link 74 (link ID=A3) from the switch 2 to the switch 3, the check frame FR is lost.

The forwarding processing unit 31 of the switch 3 receives the check frame FR (TTL=2) from the host communication unit 33 (HOST). The forwarding processing unit 31 refers to the forwarding table 32 shown in FIG. 18 to decrease the TTL by 1 and then output the check frame FR (TTL=1) to the port 39. The forwarding processing unit 51 of the switch 5 receives the check frame FR (TTL=1) from the port 59. The forwarding processing unit 51 refers to the forwarding table 52 shown in FIG. 19 to forward the check frame FR only to the host communication unit 53 (HOST). The host communication unit 53 transmits the check frame FR to the management host 1 through the control link 65. In this manner, the switch 5 becomes the response switch and transmits the check frame FR (response RES) to the management host 1.

The monitoring unit 15 of the management host 1 receives the check frame FR from the switch 5. This means that the check frame FR is transferred to the switch 5 along the loop route LP1. In other words, this means that the physical link (link ID=A5) whose destination switch is the switch 5 and included in the loop route LP1 is normal. Therefore, the monitoring unit 15 rewrites the status flag of the entry "destination switch=5, status flag=0" in the topology table TPL from "0" to "1". As a result, the status flag of the entry of link ID=A5 returns back to "1" as shown in FIG. 21.

Moreover, the forwarding processing unit 51 of the switch 5 receives the check frame FR (TTL=2) from the host communication unit 53 (HOST). The forwarding processing unit 51 refers to the forwarding table 52 shown in FIG. 19 to decrease the TTL by 1 and then output the check frame FR (TTL=1) to the port 58. The forwarding processing unit 21 of the switch 2 receives the check frame FR (TTL=1) from the port 28. The forwarding processing unit 21 refers to the forwarding table 22 shown in FIG. 17 to forward the check frame FR only to the host communication unit 23 (HOST). The host communication unit 23 transmits the check frame FR to the management host 1 through the control link 62. In this manner, the switch 2 becomes the response switch and transmits the check frame FR (response RES) to the management host 1.

The monitoring unit 15 of the management host 1 receives the check frame FR from the switch 2. This means that the check frame FR is transferred to the switch 2 along the loop route LP1. In other words, this means that the physical link (link ID=A9) whose destination switch is the switch 2 and included in the loop route LP1 is normal.

Therefore, the monitoring unit 15 rewrites the status flag of the entry "destination switch=2, status flag=0" in the topology table TPL from "0" to "1". As a result, the status flag of the entry of link ID=A9 returns back to "1" as shown in FIG. 21.

After that, the timer TM expires. At this time, the monitoring unit 15 does not yet receive the check frame FR (response RES) from the switch 3. Therefore, as shown in FIG. 21, the status flag of the entry of link ID=A3 still remains "0". The monitoring unit 15 extracts an entry whose status flag remains "0" at the time when the timer TM expires and determines a link associated with the extracted entry as the location of failure. In the present example, the physical link 74 (link ID=A3) from the switch 2 to the switch 3 is identified as the location of failure.

The monitoring unit 15 has the display unit 17 display the contents of the topology table TPL shown in FIG. 21. The display unit 17 represents that a failure is occurring at the physical link 74 (link ID=A3) from the switch 2 to the switch 3.

3. Effects

According to the present exemplary embodiment, as described above, once a check frame FR is transmitted from the management host 1 to the loop route LP for one time, then the check frame FR repeatedly circulates in the loop route LP. When the predetermined condition is satisfied, each switch on the loop route LP returns the response RES to the management host 1. The management host 1 can determine whether or not a failure relating to the loop route LP is occurring, based on reception state of the response RES from the loop route LP. According to the present exemplary embodiment, the management host 1 needs not to periodically repeat the transmission of the check frame FR in order to perform the health-checking continuously. It is therefore possible to reduce burden placed on the management host 1.

Moreover, in the case where all switches on the loop route LP become the response switch, it is also possible to determine whether or not a failure is occurring at the control link between the between the management host 1 and the switch. In other words, it is possible to concurrently perform the health-checking of not only the physical link between the switches but also the control link between the management host 1 and the switch. To this end, it is preferable that the initial value of TTL of the check frame FR is designed such that all switches on the loop route LP become the response switch.

Furthermore, according to the present exemplary embodiment, each switch is provided with the forwarding table. The transfer of the check frame FR along the loop route LP can be achieved by appropriately setting up contents of the forwarding table of each switch in accordance with the instruction from the management host 1. Therefore, each switch just needs to refer to the forwarding table to forward the received check frame FR to a designated forwarding destination. In the present exemplary embodiment, there is no need to incorporate the health-check table including information of the transfer route, the check list and the like (see Patent Literature 2, Patent Literature 3) into the check frame FR. Each switch needs not to perform such the complicated processing as described in Patent Literature 2 and Patent Literature 3 in order to achieve the forwarding of the check frame FR. As a result, burden placed on each switch also is reduced.

Moreover, according to the present exemplary embodiment, it is possible to identify the location of failure by a simple processing. The reason is that the response switch on the loop route LP returns the response RES to the management host 1. The management host 1 can easily identify the location of failure in the loop route LP based on reception state of the response RES from the loop route LP. The complicated processing such as required in Patent Literature 2 or Patent Literature 3 is not necessary for identifying the location of failure. For example, such processing as described in Patent Literature 3 that each node investigates whether or not it can communicate with the next node is not necessary. As a result, burden placed on each switch is reduced.

4. Modification Examples

In the above-described example, TTL is used as the forwarding count information of the check frame FR. However, it is not limited to that. For example, a hop number instead of TTL can be used as the forwarding count information. Even in this case, similar processing can be achieved. More specifically, the management host 1 transmits a check frame FR whose hop number is set to an initial value to one switch on the loop route LP. Each switch on the loop route LP, when receiving the check frame FR, increases the hop number of the check frame FR. The check frame FR circulates in the loop route LP, and a switch where the hop number reaches a predetermined threshold value becomes the response switch. The response switch returns the response RES back to the management host 1 and forwards the check frame FR to the subsequent switch after resetting the hop number to the initial value. Also, it is preferable that the initial value and the threshold value of the hop number are designed such that all switches on the loop route LP become the response switch, as in the case of TTL.

Alternatively, the forwarding count information such as TTL and hop number may not be used. That is, each switch on the loop route LP, when receiving the check frame FR, forwards the check frame FR to the subsequent switch and returns the response RES back to the management host 1 "with a predetermined probability". For example, each switch on the loop route LP generates a random number when receiving the check frame FR and, if the random number is equal to or larger than a predetermined threshold value, transmits the response RES to the management host 1. In this case, each switch on the loop route LP becomes the response switch with a predetermined probability. It is also possible to determine whether or not a failure is occurring at the control link between the management host 1 and the switch, because all switches on the loop route LP can become the response switch.

As to the failure location identification processing (Step S40), the following modification example also is possible. That is, the forwarding table used in the Step S40 (see FIGS. 17 to 19) is beforehand prepared and provided in each switch. Then, if a failure occurrence is detected in a certain loop route LP, the forwarding table for use in the failure location identification processing that has been beforehand prepared is used, instead of temporarily rewriting the forwarding table of the switch belonging to the loop route LP. Thus, there is no need to perform the temporal changing of the forwarding table.

It should be noted that although the term "frame" is used in the above description, the same applies to a case of "packet (IP packet etc.)".

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-021330, filed on Feb. 2, 2009, the disclosure of which is incorporated herein in its entirely by reference.

The invention claimed is:

1. A communication network management system, comprising:
a communication network including a plurality of nodes and a plurality of links connecting between said plurality of nodes; and a management computer connected to said plurality of nodes,
wherein a loop-shape communication route in said communication network comprises a loop route,
wherein said management computer transmits a frame to one node-on said loop route, wherein when receiving said frame, each node on said loop route forwards said received frame to a subsequent node along said loop route and,
wherein said frame includes forwarding count information indicating a number, wherein said management computer transmits said frame in which said number is set to an initial value to said one node, wherein said each node increases or decreases said number when receiving said frame, wherein said predetermined condition is that said number reaches a threshold value, and wherein a node on said loop route where said number reaches said threshold value comprises a response node, and wherein said response node returns said response back to said management computer and forwards said received frame to said subsequent node after resetting said number to said initial value;
wherein a node of said plurality of nodes comprises a forwarding table which indicates a correspondence relationship between an import source and a forwarding destination of said frame, and
if a predetermined condition is satisfied, returns a response back to said management computer, wherein said frame includes a destination address allocated to said loop route, wherein said management computer determines whether a failure is occurring, based on a reception state of said response, and wherein said management computer is provided apart from said plurality of nodes.

2. The communication network management system according to claim 1, wherein if said management computer receives said response from any node on said loop route within a predetermined period of time, said management computer determines that no failure is occurring in said loop route, and wherein, if said management computer fails to receive said response from all nodes on said loop route within said predetermined period of time, said management computer determines that a failure is occurring in said loop route.

3. The communication network management system according to claim 1, wherein said initial value and said threshold value are-set such that all nodes on said loop route become said response node.

4. The communication network management system according to claim 3, wherein a number of nodes included in said loop route is n, and any of natural numbers other than multiples of n and multiples of a factor of n is i, and wherein said initial value and said threshold value are set such that nodes on said loop route become said response node for every i nodes along said loop route.

5. The communication network management system according to claim 1, wherein in said each node, said predetermined condition is satisfied with a predetermined probability, and wherein, when receiving said frame, said each node forwards said received frame to said subsequent node and returns said response back to said management computer with said predetermined probability.

6. The communication network management system according to claim 3, wherein, if said management computer fails to receive said response only from a specific node on said loop route, said management computer determines that a failure is occurring between said specific node and said management computer.

7. The communication network management system according to claim 1, wherein said each node forwards said received frame as said response to said management computer.

8. The communication network management system according to claim 1, wherein said each node comprises: a table-storage unit in which a forwarding table indicating a correspondence relationship between an input source and a forwarding destination of said frame is stored; and a forwarding processing unit which forwards said frame received from said input source to said forwarding destination by referring to said forwarding table, wherein said management computer comprises: a storage unit in which loop route information indicating said loop route is stored; an entry control unit which instructs said each node to set up said forwarding table such that said frame is forwarded along said loop route; and a monitoring unit which performs transmission and reception of said frame to and from said loop route, wherein said monitoring unit transmits said frame to said one node, and wherein, when receiving said frame, said forwarding processing unit of said each node refers to said forwarding table to forward said received frame to said subsequent node and, if said predetermined condition is satisfied, returns said response back to said management computer.

9. The communication network management system according to claim 8, wherein said management computer further comprises a loop designing unit, wherein topology information indicating a physical topology of said communication network is further stored in said storage unit, and wherein said loop designing unit refers to said topology information to determine said loop route and create said loop route information.

10. The communication network management system according to claim 9, wherein said loop designing unit determines one or more loop routes such that all of said plurality of links is covered by said one or more loop routes, and wherein said monitoring unit transmits said frame to each of said one or more loop routes.

11. A management computer that manages a communication network including a plurality of nodes and a plurality of links connecting between said plurality of nodes, said management computer comprising:
a storage unit in which-loop route information indicating a loop route comprising a loop-shape communication route in said communication network is stored;
an entry control unit which instructs each node on said loop route; and
a monitoring unit which transmits a frame to one node on said loop route, wherein said-entry control unit instructs said each node to, when receiving said frame, forward said received frame to a subsequent node along said loop route and,
wherein said frame includes forwarding count information indicating a number, wherein said management computer transmits said frame in which said number is set to an initial value to said one node, wherein said each node increases or decreases said number when receiving said frame, wherein said predetermined condition is that said number reaches a threshold value, and wherein a node on said loop route where said number reaches said threshold value comprises a response node, and wherein said response node returns said response back to said management computer and forwards said received frame to said subsequent node after resetting said number to said initial value;
wherein a node of said plurality of nodes comprises a forwarding table which indicates a correspondence relationship between an import source and a forwarding destination of said frame, and
if a predetermined condition is satisfied, return a response back to said management computer, wherein said frame includes a destination address allocated to said loop route, wherein said monitoring unit determines whether a failure is occurring, based on a reception state of said response, and wherein said monitoring unit is provided apart from said entry control unit.

12. The management-computer according to claim 11, wherein, if said monitoring unit receives said response from any node on said loop route within a predetermined period of time, said monitoring unit determines that no failure is occurring in said loop route, and wherein, if said monitoring unit fails to receive said response from all nodes on said loop route within said predetermined period of time, said monitoring unit determines that a failure is occurring in said loop route.

13. A communication network management method that manages a communication network by using a management computer,
wherein said communication network includes a plurality of nodes and a plurality of links connecting between said plurality of nodes, wherein a loop-shape communication route in said communication network is a loop route,
wherein said communication network management method comprises: transmitting a frame from said management computer to one node on said loop route;
forwarding, by each node on said loop route, said frame to a subsequent node along said loop route-and, if a predetermined condition is satisfied, returning a response back to said management computer; and
wherein said frame includes forwarding count information indicating a number, wherein said management computer transmits said frame in which said number is set to an initial value to said one node, wherein said each node increases or decreases said number when receiving said frame, wherein said predetermined condition is that said number reaches a threshold value, and wherein a node on said loop route where said number reaches said threshold value comprises a response node, and wherein said response node returns said response back to said management computer and forwards said received frame to said subsequent node after resetting said number to said initial value;
wherein a node of said plurality of nodes comprises a forwarding table which indicates a correspondence relationship between an import source and a forwarding destination of said frame, and
determining whether a failure is occurring, based on a reception state of said response in said management computer, wherein said frame includes a destination address allocated to said loop route, and wherein said management computer is provided apart from said plurality of nodes.

14. A management program recorded on a tangible non-transitory computer-readable medium that, when executed, causes a management computer to perform a management processing of a communication network,
wherein said communication network includes a plurality of nodes and a plurality of links connecting between said plurality of nodes,
wherein said management processing comprises: storing loop route information indicating a loop route comprising a loop-shape communication route in said communication network, in a storage device;
instructing each node on said loop-route to, when receiving a frame, forward said received frame to a subsequent node along said loop route and, if a predetermined condition is satisfied, return a response back to said management computer; transmitting a frame to one node on said loop route; and wherein said frame includes forwarding count information indicating a number, wherein said management computer transmits said frame in which said number is set to an initial value to said one node, wherein said each node increases or decreases said number when receiving said frame, wherein said predetermined condition is that said number reaches a threshold value, and wherein a node on said loop route where said number reaches said threshold value comprises a response node, and wherein said response node returns said response back to said management computer and forwards said received frame to said subsequent node after resetting said number to said initial value:

wherein a node of said plurality of nodes comprises a forwarding table which indicates a correspondence relationship between an import source and a forwarding destination of said frame, and determining whether a failure is occurring, based on a reception state of said response, wherein said frame includes a destination address allocated to said loop route, and wherein said management computer is provided apart from said plurality of nodes.

15. The management computer according to claim 11, wherein said monitoring unit comprises a timer.

16. The management computer according to claim 15, wherein an operation of said timer is started at a same time as a transmission of said frame.

17. The communication network management system according to claim 1, wherein said frame is continuously circulated in said loop route.

18. The communication network management system according to claim 1, wherein said forwarding table is set up in accordance with an instruction from said management computer.

* * * * *